United States Patent
Sahashi et al.

(10) Patent No.: US 8,443,289 B2
(45) Date of Patent: May 14, 2013

(54) DISPLAY INSTRUCTION APPARATUS, DISPLAY INSTRUCTION METHOD, AND COMPUTER PROGRAM PRODUCT

(75) Inventors: Yukiko Sahashi, Tokyo (JP); Takahiro Asai, Kanagawa (JP); Takuya Imai, Tokyo (JP); Mototsugu Emori, Saitama (JP); Naoki Umehara, Chiba (JP)

(73) Assignee: Ricoh Company, Limited, Tokyo (JP)

( * ) Notice: Subject to any disclaimer, the term of this patent is extended or adjusted under 35 U.S.C. 154(b) by 1202 days.

(21) Appl. No.: 12/046,905

(22) Filed: Mar. 12, 2008

(65) Prior Publication Data
US 2008/0229208 A1 Sep. 18, 2008

(30) Foreign Application Priority Data
Mar. 13, 2007 (JP) ................................. 2007-064113

(51) Int. Cl.
*G06F 3/048* (2006.01)
*G06F 15/173* (2006.01)

(52) U.S. Cl.
USPC ........... 715/748; 715/736; 715/737; 715/740; 715/769

(58) Field of Classification Search .................. 715/736, 715/769, 737, 738
See application file for complete search history.

(56) References Cited

U.S. PATENT DOCUMENTS

| | | | | |
|---|---|---|---|---|
| 5,978,559 A | * | 11/1999 | Quinion | 358/1.15 |
| 6,411,314 B1 | * | 6/2002 | Hansen et al. | 715/769 |
| 6,556,875 B1 | * | 4/2003 | Nagasaka et al. | 700/19 |
| 6,725,300 B1 | * | 4/2004 | Nagasaka et al. | 710/62 |
| 7,293,067 B1 | * | 11/2007 | Maki et al. | 709/217 |
| 7,730,223 B1 | * | 6/2010 | Bavor et al. | 710/8 |
| 7,757,180 B2 | * | 7/2010 | Nakai et al. | 715/769 |
| 7,995,090 B2 | * | 8/2011 | Liu et al. | 348/14.01 |
| 2001/0052995 A1 | * | 12/2001 | Idehara | 358/1.15 |
| 2003/0181995 A1 | * | 9/2003 | Nagasaka et al. | 700/19 |
| 2005/0038530 A1 | * | 2/2005 | Nagasaka et al. | 700/19 |
| 2005/0157330 A1 | * | 7/2005 | Giuliano | 358/1.15 |
| 2006/0031375 A1 | * | 2/2006 | Danker et al. | 709/207 |
| 2006/0080432 A1 | * | 4/2006 | Spataro et al. | 709/224 |
| 2006/0143574 A1 | * | 6/2006 | Ito et al. | 715/800 |
| 2007/0216938 A1 | * | 9/2007 | Tomita | 358/1.15 |

FOREIGN PATENT DOCUMENTS

| | | |
|---|---|---|
| JP | 2001-159939 | 6/2001 |
| JP | 2002-281468 | 9/2002 |
| JP | 2003-52093 | 2/2003 |
| JP | 2003-84937 | 3/2003 |

OTHER PUBLICATIONS

Japanese Office Action mailed on Aug. 23, 2011 issued for JP Application No. 2007-064113, filed on Mar. 12, 2008.

* cited by examiner

*Primary Examiner* — Daeho Song
(74) *Attorney, Agent, or Firm* — Oblon, Spivak, McClelland, Maier & Neustadt, L.L.P.

(57) ABSTRACT

A display instruction apparatus transmits a display screen on which symbols representing network devices connected to a network are displayed to a client terminal connected to the network; and transmits, when a drag-and-drop operation between symbols of network devices is received from the client terminal, an instruction for executing a predetermined process between the network devices that are subjected to the drag-and-drop operation to the network devices.

18 Claims, 21 Drawing Sheets

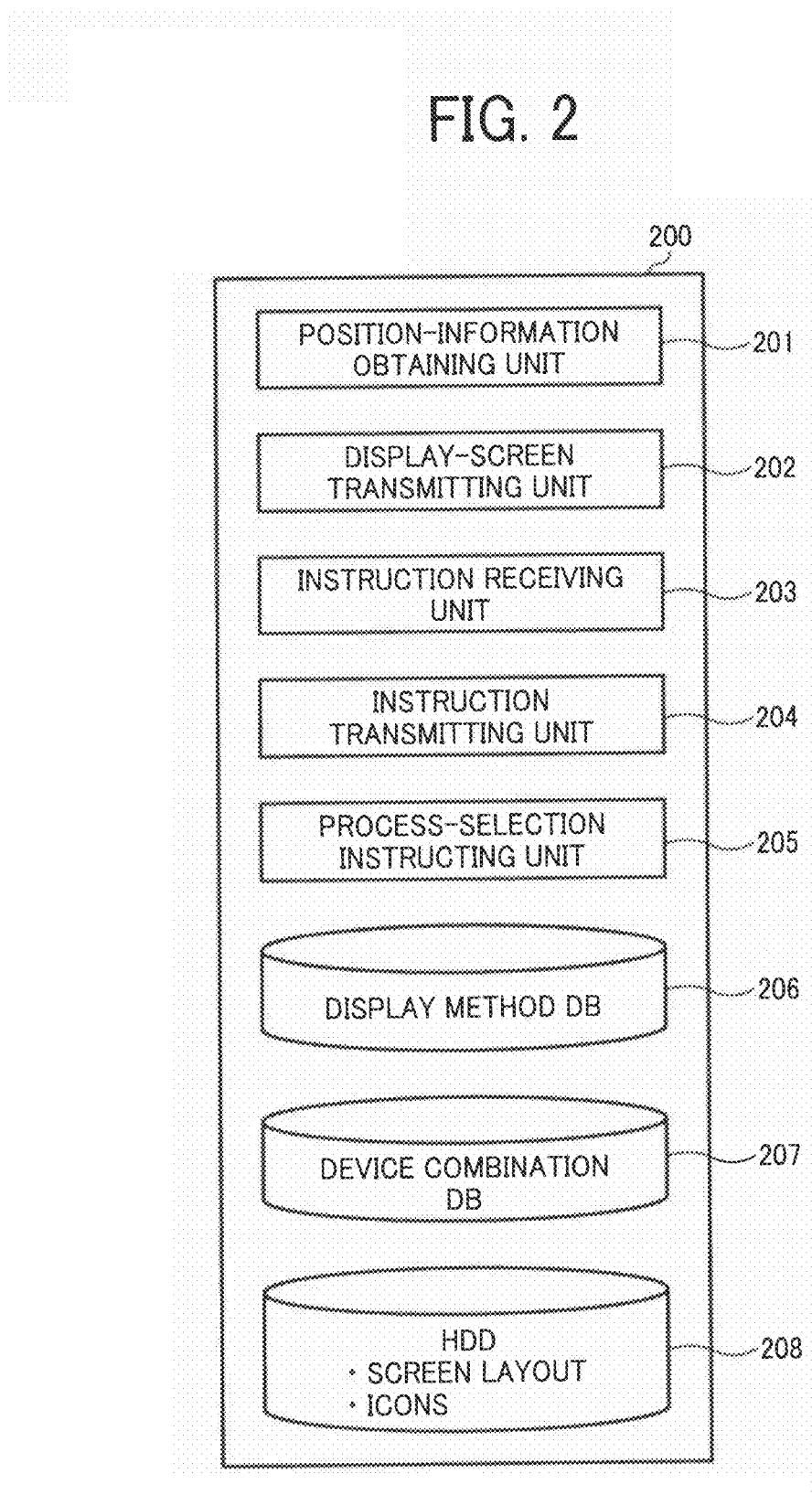

FIG. 3

| DEVICE NAME | DISPLAY METHOD | DISPLAY CONTENTS | POSITION |
|---|---|---|---|
| PRINTER-A | PRINTER ICON (PTA.ICO) | ICON | LIVING ROOM |
| PRINTER-B | PRINTER ICON (PTB.ICO) | ICON/MAP | 8F (20, 30) MEETING ROOM |
| PC-A | NOTEBOOK PC ICON (PCA.ICO) | ICON/MAP | 8F (20, 20) LIVING ROOM |
| PC-B | DESKTOP PC ICON (PCB.ICO) | ICON | 8F (30, 40) MEETING ROOM |
| ... | ... | ... | ... |

| DEVICE 1 | DEVICE 2 | JOB TYPE |
|---|---|---|
| PRINTER, MFP | PRINTER, MFP | JOB MOVING JOB DIVIDING JOB COPYING |
| PRINTER, MFP | PC | SET AS DEFAULT PRINTER SET TO THIS PRINTER |
| PC | PC | IM TRANSMISSION IP PHONE FILE TRANSMISSION |
| ... | ... | ... |

207

| DEVICE NAME | DEVICE ATTRIBUTE | IP ADDRESS | PRESENCE | RELATED JOB |
|---|---|---|---|---|
| PRINTER-A | COLOR | XXX.xxx.xxx.1 | IDLING | JOB 1<br>JOB 2 |
| PRINTER-B | MONOCHROME | XXX.xxx.xxx.2 | PRINTING | |
| MFP-C | COLOR | XXX.xxx.xxx.3 | IDLING | JOB 3 |
| ... | ... | ... | ... | ... |

FIG. 22

| PRESENCE 1 | PRESENCE 2 | JOB TYPE |
|---|---|---|
| IM ALLOWED<br>IP PHONE ALLOWED<br>FILE TRANSMISSION ALLOWED | IM ALLOWED<br>IP PHONE ALLOWED<br>FILE TRANSMISSION ALLOWED | IM ALLOWED<br>IP PHONE ALLOWED<br>FILE TRANSMISSION ALLOWED |
| IM ALLOWED<br>IP PHONE ALLOWED<br>FILE TRANSMISSION ALLOWED | IM ALLOWED | IM ALLOWED |
| ... | ... | ... |

2207

| PC AND TERMINAL | USER | IP ADDRESS | PRESENCE |
|---|---|---|---|
| PC-A | MR. A | XXX.xxx.yyy.1 | IM ALLOWED<br>IP PHONE ALLOWED<br>FILE TRANSMISSION ALLOWED |
| PC-B | MR. B | XXX.xxx.yyy.2 | IM ALLOWED<br>IP PHONE ALLOWED<br>FILE TRANSMISSION ALLOWED |
| PC-C | — | XXX.xxx.yyy.3 | — |
| PORTABLE TERMINAL C | MR. C | XXX.xxx.zzz.3 | IM ALLOWED |
| ... | ... | ... | ... |

DISPLAY INSTRUCTION APPARATUS, DISPLAY INSTRUCTION METHOD, AND COMPUTER PROGRAM PRODUCT

CROSS-REFERENCE TO RELATED APPLICATIONS

The present application claims priority to and incorporates by reference the entire contents of Japanese priority document 2007-064113 filed in Japan on Mar. 13, 2007.

BACKGROUND OF THE INVENTION

1. Field of the Invention

The present invention relates to a display instruction apparatus, a display instruction method, and computer program product.

2. Description of the Related Art

In recent years, there are many types of instant messaging (IM) and IP phone in offices, with employees using information processing apparatuses, such as personal computers (PCs), connected to a network, and also using network devices, such as image forming apparatuses including printers and multifunction products (MFPs), connected simultaneously to the network, information storage servers, and the network. When these devices are used, Internet Protocol (IP) addresses indicating addresses of devices are required to be specified. When a user operates an information processing apparatus, specifying an IP address is burdensome for the user and is very difficult to understand. On the other hand, a scheme can be thought such that a name that is easy for the user to recognize is associated with an IP address. However, it is not easy to recognize the thing indicated by the name and, moreover, inputting such a name is cumbersome.

Therefore, as a scheme of making an instruction for a process on a network device, generally known are technologies of using a Graphical User Interface (GUI) to perform a drag-and-drop operation in which a symbol, such as an icon, is dragged and dropped into a predetermined area, thereby making an instruction for a process on a network device.

A first conventional technology (for example, refer to Japanese Patent Application Laid-Open No. 2003-84937) relates to a system including a host apparatus and an information processing apparatus connected to a network, wherein an icon that is subjected to a job process is dragged and dropped onto an icon representing the information processing apparatus, thereby making an instruction for the job process. In this technology, the information processing apparatus includes a unit that detects a possible process as a job, and the host apparatus receives the result indicative of the detection to make an instruction for the process.

Moreover, a second conventional technology (for example, refer to Japanese Patent Application Laid-open No. 2003-52093) relates to a control apparatus in which local network devices within home connected to a global network are stored with their network addresses and a Web page for display according to a visual map database is generated to remotely control the devices. In this disclosed technology, an icon representing a network device is dragged and dropped onto an icon representing another device. With this, settings can be made that cause a plurality of devices to successively perform processing.

However, in the first conventional technology, the icon that is subjected to the drag-and-drop operation, that is, the dragged icon, is an icon representing data, such as an icon representing document data, that is subjected to a job process. Therefore, it is merely possible to specify data to be processed for one network device for executing a job.

Moreover, in the second conventional technology, an icon representing a network device is dragged and dropped onto an icon representing another network device. However, a process to be executed by this operation is, for example, a combined process, such as process A+process B. Therefore, load distribution among the network devices cannot be achieved.

Furthermore, it is complicated for individuals to install a newly-registered network device. There is also a problem that, for example, a person may fail to notice the placement of a new network device without delay and therefore may not be able to advantageously use the newly-introduced network device. Furthermore, for the purpose of speedy operation, selection of an optimum network device and load distribution among a plurality of networks become important problems.

Moreover, for communications among users, a user first selects a way of communications, such as telephone, mail, or IM. Therefore, a more direct instruction is desirable, instead of further selecting a communication counterpart.

SUMMARY OF THE INVENTION

It is an object of the present invention to at least partially solve the problems in the conventional technology.

According to an aspect of the present invention, there is provided a display instruction apparatus including a display-screen transmitting unit that transmits a display screen on which symbols representing a plurality of network devices connected to a network are displayed at appropriate positions to a client terminal connected to the network; and an instruction transmitting unit that transmits, when a drag-and-drop operation between symbols of network devices is received from the client terminal, an instruction for executing a predetermined process between the network devices that are subjected to the drag-and-drop operation to the network devices.

According to another aspect of the present invention, there is provided a display instruction method including transmitting a display screen on which symbols representing a plurality of network devices connected to a network are displayed at appropriate positions to a client terminal connected to the network; and transmitting, when a drag-and-drop operation between symbols of network devices is received from the client terminal, an instruction for executing a predetermined process between the network devices that are subjected to the drag-and-drop operation to the network devices.

According to still another aspect of the present invention, there is provided a computer program product including a computer usable medium having computer readable program codes embodied in the medium that, when executed, causes a display instruction apparatus to execute the above display instruction method.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 2 is a block diagram of a functional configuration of a display instruction server in FIG. 1;

FIG. 3 is a table illustrating one example of data of a display method database (DB);

FIG. 4 is a table illustrating one example of data of a device combination DB;

FIG. 22 is a table illustrating one example of data of a presence combination DB;

DETAILED DESCRIPTION OF THE PREFERRED EMBODIMENTS

Exemplary embodiments of the present invention are explained in detail below with reference to the accompanying drawings.

Figure 1:
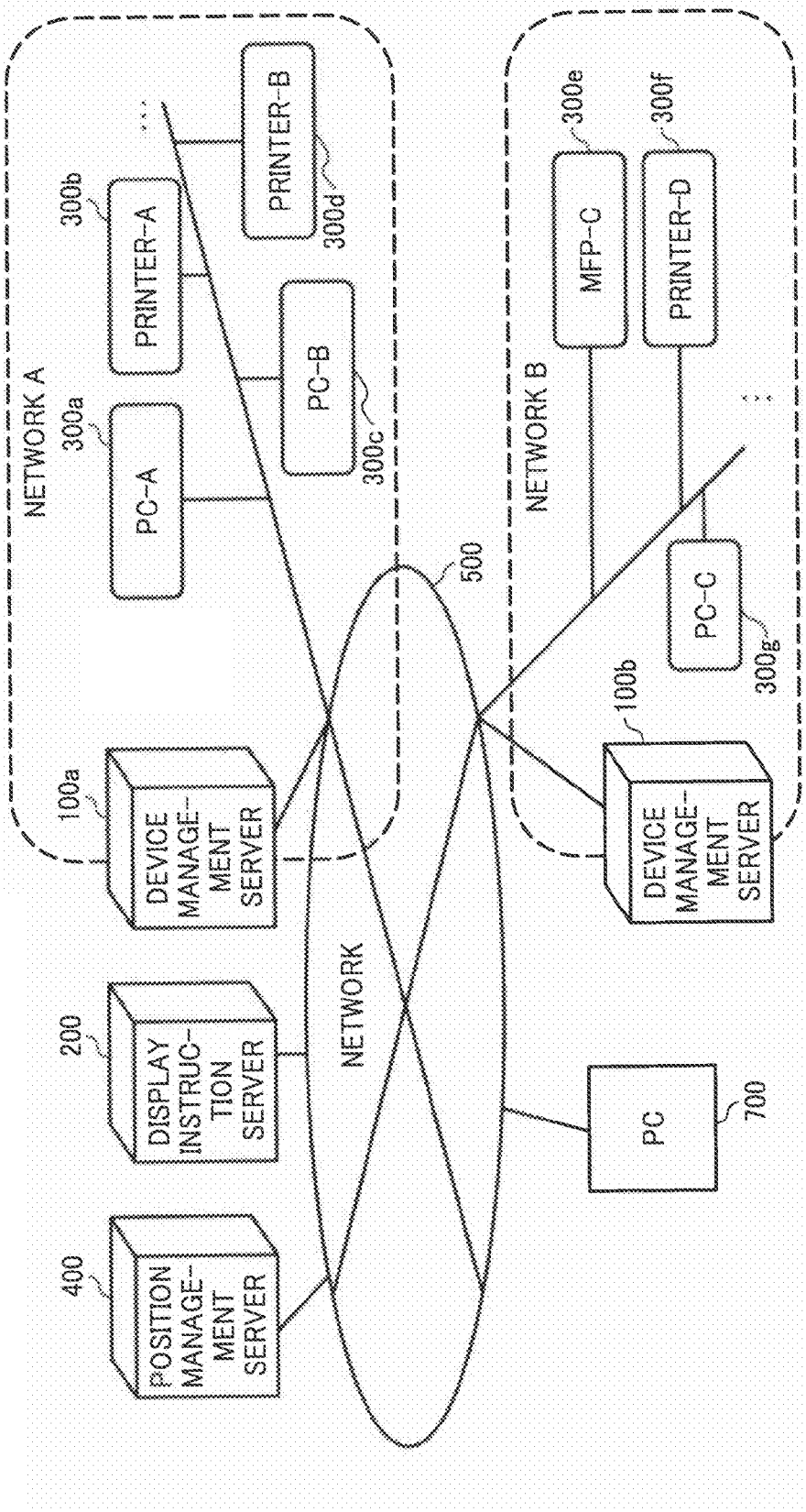
FIG. 1 is a block diagram of a network configuration of a display instruction system according to a first embodiment of the present invention.

FIG. 1 is a block diagram of a network configuration of a display instruction system according to a first embodiment. The display instruction system according to the first embodiment includes, as shown in FIG. 1, device management servers 100a and 100b, a display instruction server 200, a position management server 400, and a PC 700 as a client terminal that are connected to each other via a network 500, such as a Local Area Network (LAN) or a Wide Area Network (WAN).

The device management server 100a is a server that manages network devices in a network A, while the device management server 100a is a server that manages network devices in a network B. In the example of FIG. 1, as network devices of the network A, a PC-A 300a, a printer-A 300b, a PC-B 300c, and a printer-B 300d are connected, and as network devices of the network B, a PC-C 300g, an MFP-C 300e, and a printer-D 300f are connected. However, the network devices are not meant to be restricted to these components.

The position management server 400 is a server device that manages position information of each network device in the network A and the network B. The position information represents position coordinates of each network device on a device layout screen that is displayed on the PC 700 as a client terminal by the display instruction server 200 transmitting it to the PC 700. The position management server 400 has a position database (not shown) stored in a storage medium, such as a hard disk drive device (HDD) or memory. In the position database, identification information, such as names of the network devices, and position information are associated with each other. When a request for position information specifying identification information of a network device is issued from other servers or the like, a response is made with the requested position information of the network device.

The display instruction server 200 is a server device that causes a display screen on which icons representing network devices are displayed at positions on the device layout image corresponding to placement locations to be transmitted to the PC 700 as a client terminal for display, and also receives an instruction on such a display screen from the PC 700 to transmit a process execution instruction for executing a process corresponding to the instruction to the device management servers 100a and 100b.

FIG. 2 is a block diagram of a functional configuration of the display instruction server 200 according to the first embodiment. As shown in FIG. 2, the display instruction server 200 includes a position-information obtaining unit 201, a display-screen transmitting unit 202, an instruction receiving unit 203, an instruction transmitting unit 204, a process-selection instructing unit 205, a display method database (DB) 206, a device combination DB 207, and an HDD 208 storing data representing a screen layout and icons. The display method DB 206 and the device combination DB 207 are stored in a storage medium, such as an HDD or memory.

The position-information obtaining unit 201 is a processing unit that requests the position management server 400 for position information of a network device (position coordinates on the screen layout) and obtains the position information.

The display-screen transmitting unit 202 is a processing unit that generates a display screen on which icons representing network devices are displayed at positions on the screen layout corresponding to placement locations and transmits the display screen to the PC 700 for display. The icons are pictures or pictographs representing various data and process functions for display on the display screen. Although the icons representing the network devices are displayed on the display screen in the present embodiment, this is not meant to be restrictive. Alternatively, symbols including the icons, and signs and character strings representing various data and process functions can be displayed on the display screen.

The process-selection instructing unit 205 is a processing unit that transmits, when an instruction by a drag-and-drop operation by an operator on the display screen displayed on the PC 700 is received, a process selection instruction for selecting a type of job to be executed among the network devices corresponding to the icons that are subjected to the drag-and-drop operation, the instruction being transmitted to the PC 700.

The instruction receiving unit 203 is a processing unit that receives the instruction by the drag-and-drop operation by the operator on the display screen displayed on the PC 700. Specifically, the instruction receiving unit 203 receives a device name of the network device corresponding to the icon that is subjected to the drag-and-drop operation and the type of job specified in response to the process selection instruction.

The instruction transmitting unit 204 is a processing unit that specifies a process to be executed based on the received device name of the network device and type of job and transmits a process execution instruction for executing the specified process to the device management server that manages the network device that is subjected to the drag-and-drop operation.

The display method DB 206 is a database that defines a display method on the network-device screen layout for each network device. FIG. 3 is a table illustrating one example of data of the display method DB 206.

As shown in FIG. 3, the display method DB 206 has registered therein a device name of a network device, a display method, display contents, and position information associated with each other. The display method indicates which icon is used to display the network device on the screen layout. As the display method, a type of icon and a file name of an icon image are registered. The display contents specify either an icon or a map to display the network device. The position information has registered therein position coordinates of the network device on the screen layout obtained from the position management server 400.

The device combination DB 207 is a database having registered therein types of job (process) executable by dragging and dropping an icon based on a combination of network devices. FIG. 4 is a table illustrating one example of data of the device combination DB 207.

As shown in FIG. 4, types of job executable are registered correspondingly to the types of network device subjected to a drag-and-drop operation. In FIG. 4, IM transmission is transmission of instant messages.

Figures 5, 6:
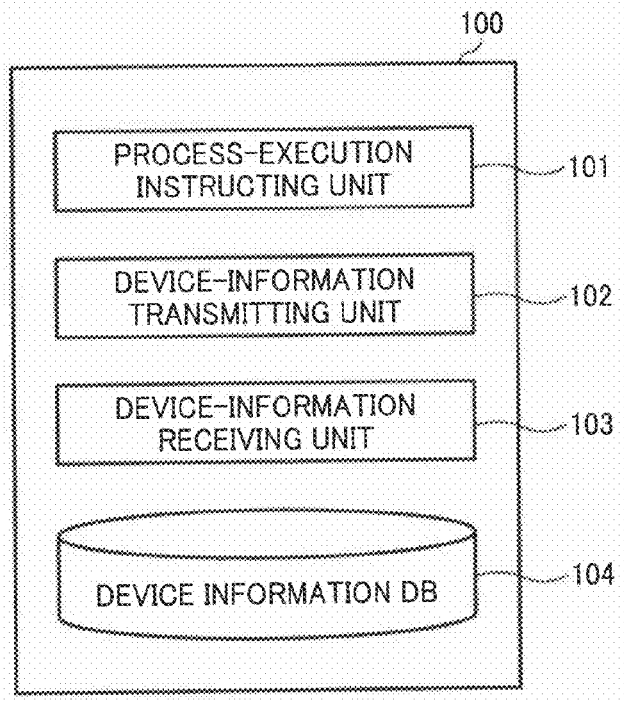
FIG. 5 is a block diagram of a functional configuration of a device management server in FIG. 1.
FIG. 6 is a table illustrating one example of data of a device information DB.

Next, the device management server 100 (100*a* and 100*b*) is explained. FIG. 5 is a block diagram of a functional configuration of the device management server 100. As shown in FIG. 5, the device management server 100 includes a process-execution instructing unit 101, a device-information transmitting unit 102, a device-information receiving unit 103, and a device information DB 104.

The device-information receiving unit 103 is a processing unit that receives a state from each network device at predetermined intervals, such as a job execution state of the network device, within the network managed by its own, and registers the state in the device information DB 104.

The device-information transmitting unit 102 is a processing unit that reads, when a request for device information of a specified network device is received from the display instruction server 200, the device information of the relevant network device from the device information DB 104 and then transmits the read device information to the display instruction server 200.

The process-execution instructing unit 101 is a processing unit that instructs, when a process execution instruction is received from the display instruction server 200, the network device that is subjected to the process execution instruction to execute the process.

The device information DB 104 is a database having registered therein device information regarding the network devices, and is stored in a storage device, such as an HDD or memory. FIG. 6 is a table illustrating one example of data of the device information DB 104.

As shown in FIG. 6, the device information DB 104 has registered therein, as device information, a device name, device attribute, Internet Protocol (IP) address, and a presence showing the present state of a network device, and related job(s) currently executed or scheduled to be executed in the network device. AS shown in FIG. 6, idling, printing, and others are registered as the presence.

Figure 7:
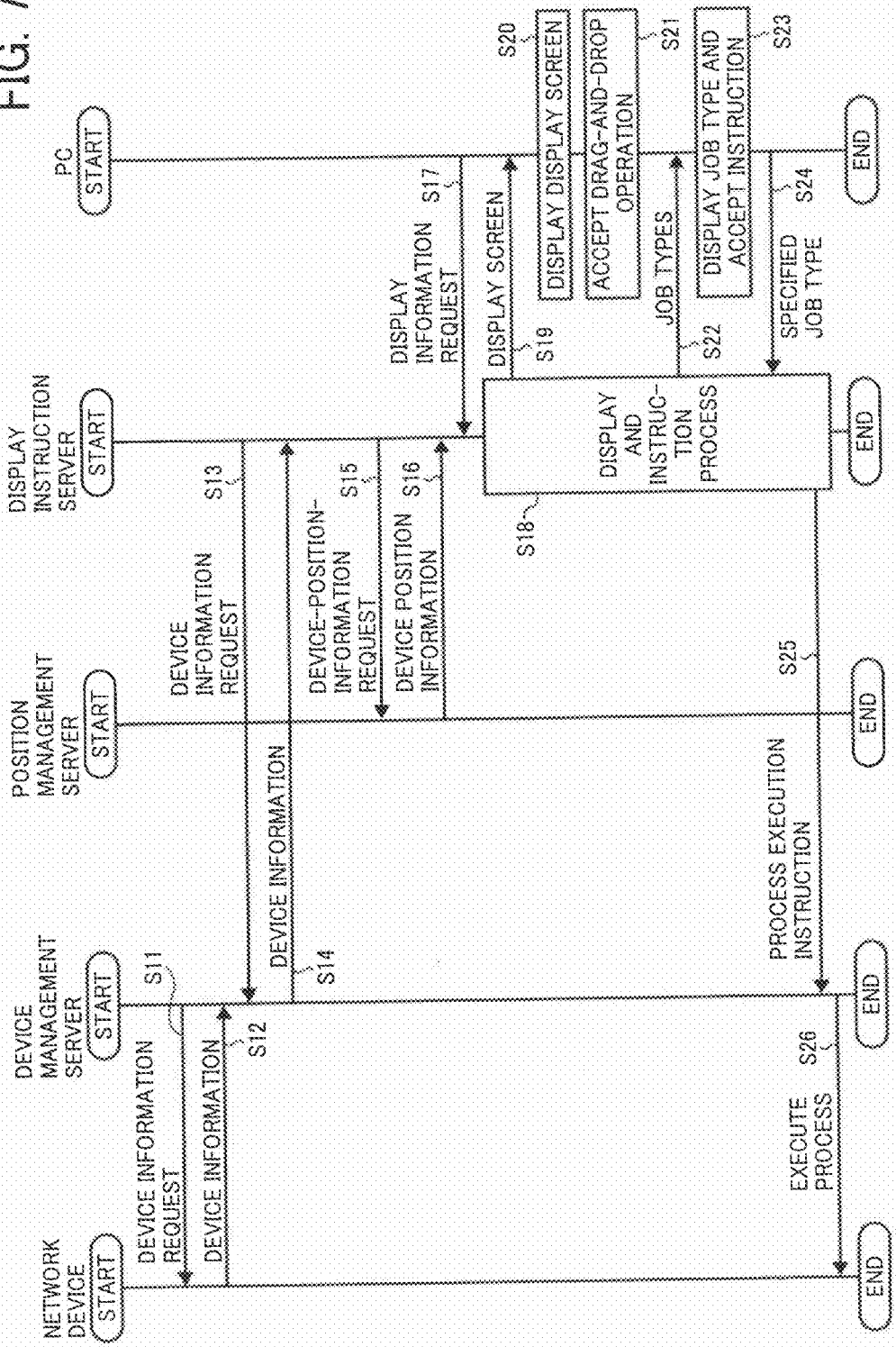
FIG. 7 is a sequence diagram of a flow of an entire process of the display instruction system according to the first embodiment.

Next, an entire process of the display instruction system configured as explained above according to the present embodiment is explained. FIG. 7 is a sequence diagram of a flow of an entire process of the display instruction system according to the first embodiment.

First, the device management servers 100*a* and 100*b* transmit a device information request to network devices at predetermined intervals (step S11). In response, each network device transmits its own device information (step S12). These processes at steps S11 and S12 are all performed for each network device, and are also repeatedly executed at predetermined intervals. The device management servers 100*a* and 100*b* obtaining the device information then register the obtained device information with the device information DB 104.

Next, to generate a display screen to be displayed on the PC 700, the display instruction server 200 transmits to the device management server 100 a device information request, with the device names of all network devices to be displayed on the display screen being specified (step S13). The device management server 100 that has received the device information request reads the device information of the network devices requested by the device information DB 104, and then transmits the read device information to the display instruction server 200 (step S14).

Next, the display instruction server 200 transmits to the position management server 400 a request for position information of the network devices, with the device names of all network devices to be displayed on the display screen being specified (step S15). The position management server 400 that has received the position information request reads position coordinates of the network devices requested from the position information DB on the screen layout, and then transmits the position coordinates as position information to the display instruction server 200 (step S16). The display instruction server 200 that has received the position information of the network devices then registers the received position information with the display method DB 206.

Upon reception of a display information request from the PC 700 (step S17), the display instruction server 200 executes a display and instruction process (step S18). During this display and instruction process, the display instruction server 200 generates a display screen for transmission to the PC 700 (step S19).

The PC 700 that has received the display screen causes the display screen to be displayed on a displaying device, such as a display device (step S20). When the operator of the PC 700 performs a drag-and-drop operation for an icon representing a network device on the display screen, the PC 700 receives this operation (step S21), and then transmits information as such to the display instruction server 200.

The display instruction server 200 then refers to the device combination DB 207 and transmits job types corresponding to the network device specified by the drag-and-drop operation as a process selection instruction to the PC 700 (step S22).

The PC 700 displays the received job types (the process selection instruction) on the display screen and receives the process selection instruction from the operator (step S23), and then transmits a specified job type to the display instruction server 200 (step S24). The display instruction server 200 then determines a process to be executed on the network device according to the received job, and transmits a process execution instruction for executing the determined process to the device management servers 100*a* and 100*b* (step S25).

The device management servers 100*a* and 100*b* that have received the process execution instruction then instruct each network device to execute the process according to the process execution instruction (step S26). With this, the process of the specified job is executed among the network devices that are subjected to the drag-and-drop operation on the PC 700.

Figure 8:
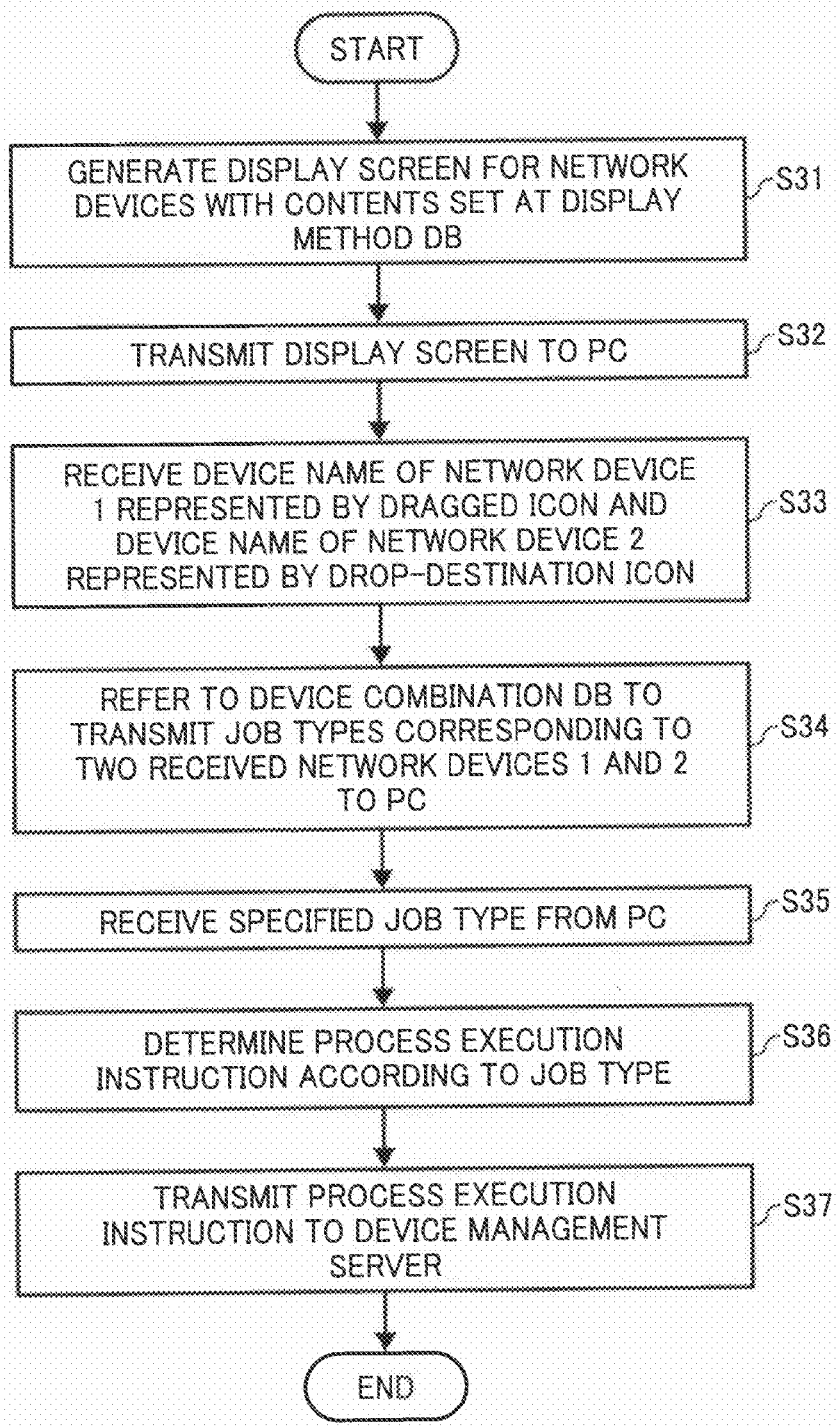
FIG. 8 is a flowchart of a procedure of a display and instruction process performed at the display instruction server according to the first embodiment.

Next, details of the display and instruction process at step S18 are explained. FIG. 8 is a flowchart of a procedure of a display and instruction process performed at the display instruction server 200. Upon reception of the display information request with specified placement locations from the PC 700, the display-screen transmitting unit 202 refers to the display method DB 206 to generate a display screen for the network devices with contents set at the display method DB 206 (step S31). At this time, a screen layout corresponding to the requested placement locations is read from the HDD 208, and also icon images are read based on the file names of the icon images set at the display method DB 206. Then, by placing the icon images on the screen layout at the coordinate positions registered as position information in the display method DB 206, a display screen is generated.

Next, the display-screen transmitting unit 202 transmits the generated display screen to the PC 700 (step S32). In the PC 700, the display screen is displayed, and when the operator drags and drops an icon representing a network device on the display screen, the instruction receiving unit 203 of the display instruction server 200 receives from the PC 700 the device name of the dragged network device and the device name of the drop-destination network device (step S33).

The process-selection instructing unit 205 then refers to the device combination DB 207 to transmit job types corresponding to these two received device names as a process selection instruction to the PC 700 (step S34). Then, the instruction receiving unit 203 receives a specified job type from the PC 700 (step S35), and the instruction transmitting unit 204 determines a process execution instruction according to the received job (step S36), and transmits the determined process execution instruction to the device management server 100 (step S37).

Figure 9:
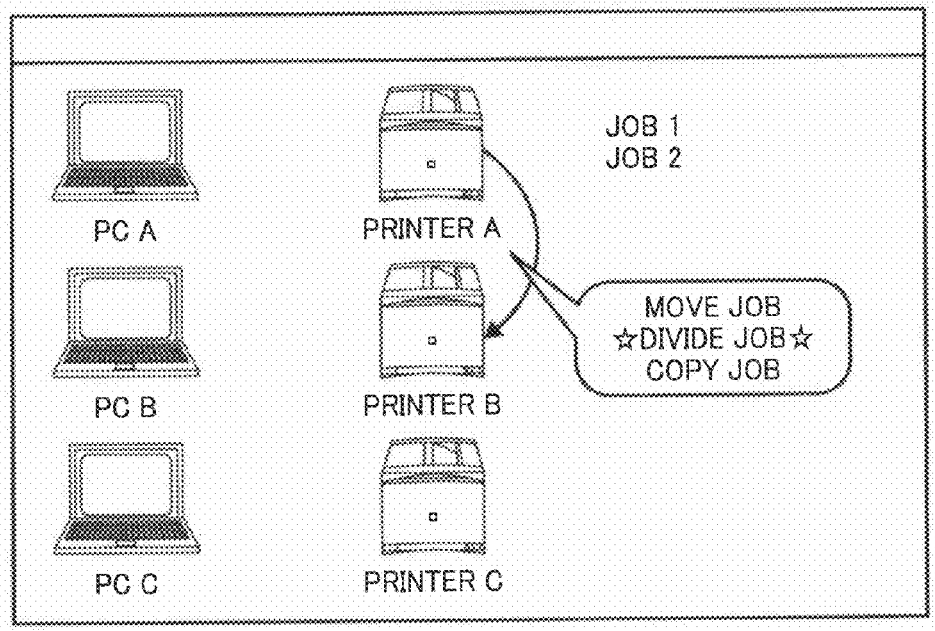
FIG. 9 is a schematic diagram of one example of a display screen displayed when an icon representing a printer A is dragged and dropped onto an icon representing a printer B.
Figure 10:
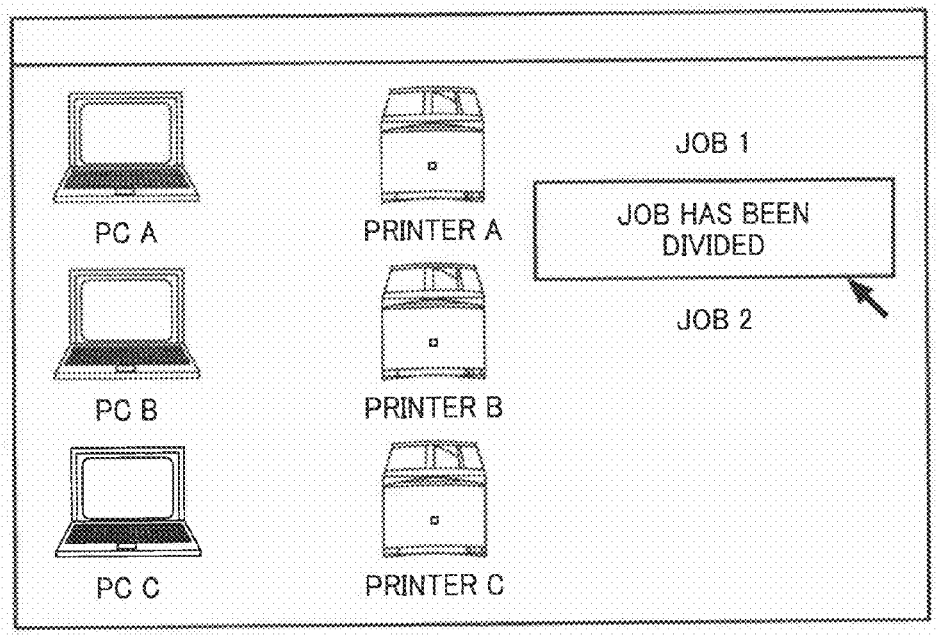
FIG. 10 is a schematic diagram of a display screen displayed after job dividing is selected.
Figure 11:
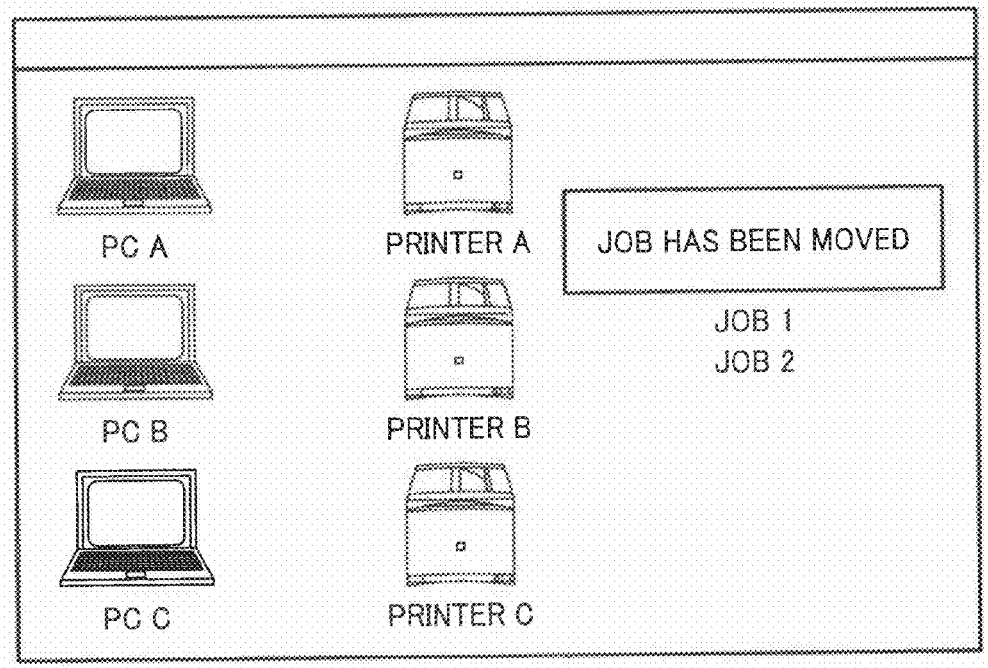
FIG. 11 is a schematic diagram of a display screen displayed after job moving is selected.
Figure 12:
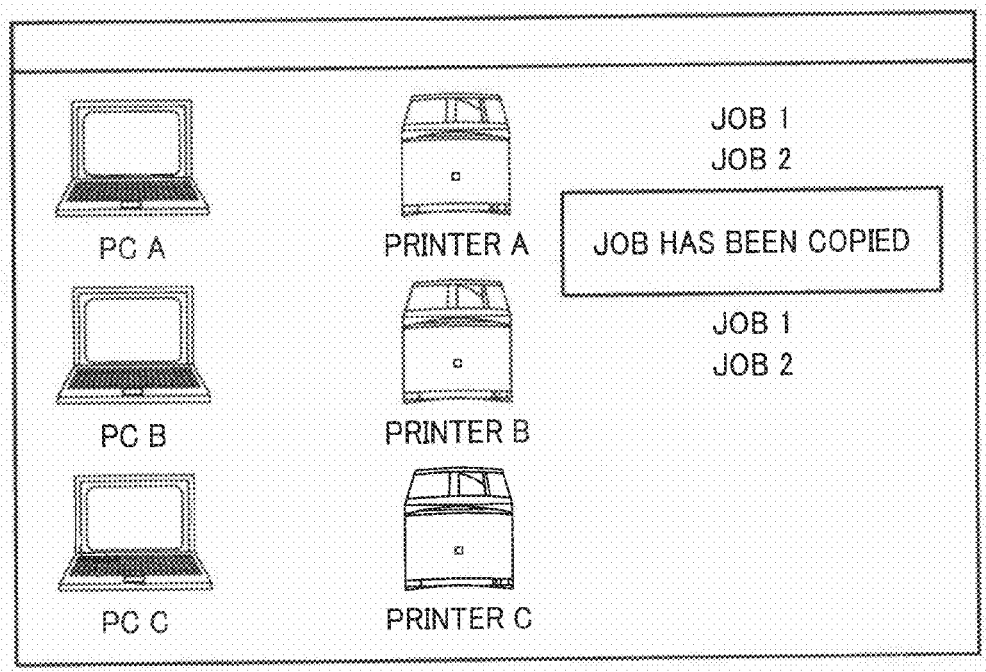
FIG. 12 is a schematic diagram of a display screen displayed after job copying is selected.

FIG. 9 is a schematic diagram of one example of the display screen displayed when an icon representing the printer A is dragged and dropped onto an icon representing the printer B. In this case, as the job types for the process selecting instruction based on the device combination DB 207, job moving, job dividing, and job copying are displayed. FIG. 10 is a schematic diagram of a display screen displayed after the job dividing is selected, FIG. 11 is a schematic diagram of a display screen displayed after the job moving is selected, and FIG. 12 is a schematic diagram of a display screen displayed after the job copying is selected.

The job moving means that the job being executed at the dragged network device is moved to the drop-destination network device. In this case, the process execution instruction to the device management server 100 determined by the instruction transmitting unit 204 includes a job canceling instruction for canceling the job being executed at the dragged network device and a job generating instruction for generating the job at the drop-destination network device.

The job dividing means that part of a plurality of jobs being executed at the dragged network device is moved to the drop-destination network device. In this case, the process execution instruction to the device management server 100 determined by the instruction transmitting unit 204 includes a job canceling instruction for canceling the part of the jobs being executed at the dragged network device and a job generating instruction for generating the part of the jobs at the drop-destination network device.

The job copying means that the job(s) being executed at the dragged network device is copied to the drop-destination network device. In this case, the process execution instruction to the device management server 100 determined by the instruction transmitting unit 204 includes a job generating instruction for generating at the drop-destination network device the same job being executed at the dragged network device.

Figure 13:
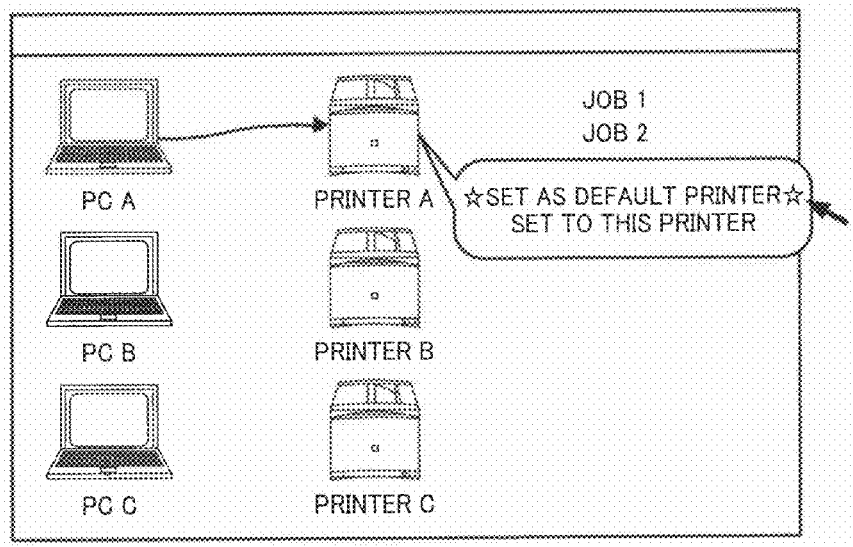
FIG. 13 is a schematic diagram of one example of a display screen displayed when an icon representing a PC-A is dragged and dropped onto the icon representing the printer A.
Figure 14:
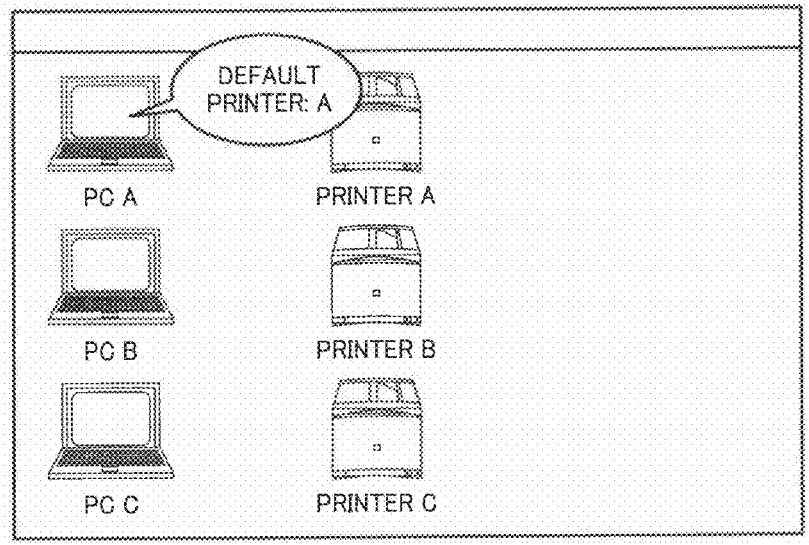
FIG. 14 is a schematic diagram of a display screen displayed after a default printer is set.
Figure 15:
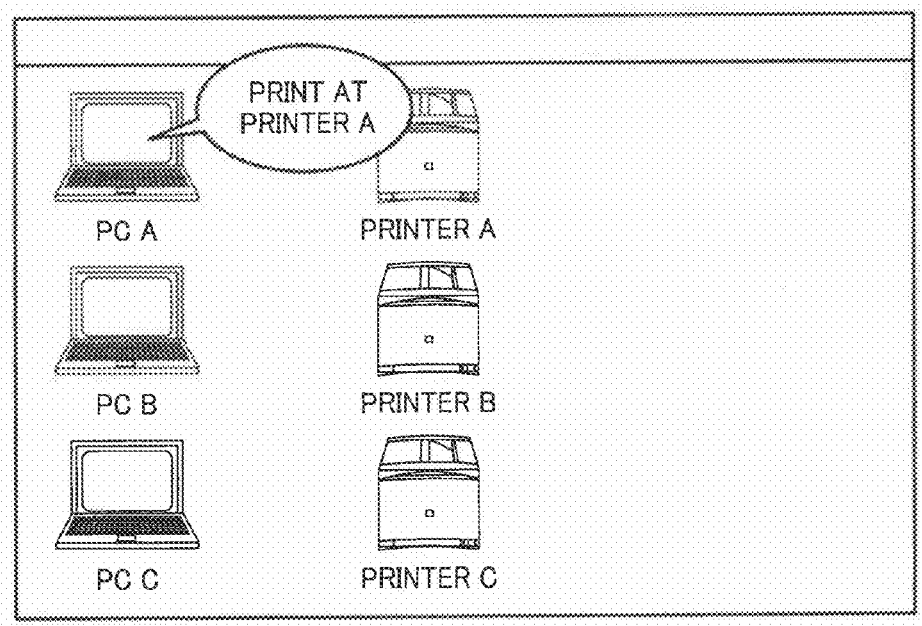
FIG. 15 is a schematic diagram of a display screen displayed after this printer is set.

FIG. 13 is a schematic diagram of one example of a display screen displayed when an icon representing the PC-A is dragged and dropped onto the icon representing the printer A. In this case, as the job types for the process selection instruction based on the device combination DB 207, "set as default printer" and "set to this printer" are displayed. FIG. 14 is a schematic diagram of a display screen displayed after a default printer is set, and FIG. 15 is a schematic diagram of a display screen displayed after this printer is set.

The "set as default printer" means that the drop-destination network device (printer) is set as a default printer to the dragged network device (PC). In this case, the process execution instruction to the device management server 100 determined by the instruction transmitting unit 204 includes an instruction for setting the drop-destination network device to the dragged network device.

The "set to this printer" means that the drop-destination network device (printer) is temporarily (within the current session, within a predetermined time, or others) set as a print destination of the dragged network device (PC). In this case, the process execution instruction to the device management server 100 determined by the instruction transmitting unit 204 includes an instruction for temporarily setting the drop-destination network device to the dragged network device.

Figure 16:
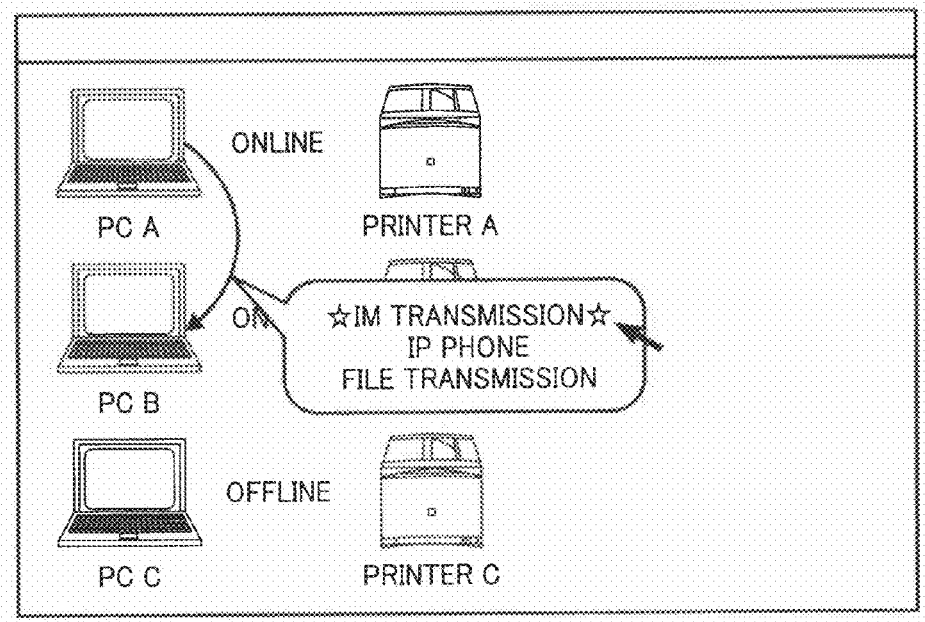
FIG. 16 is a schematic diagram of one example of a display screen displayed when the icon representing the PC-A is dragged and dropped onto an icon representing a PC-B.
Figure 17:
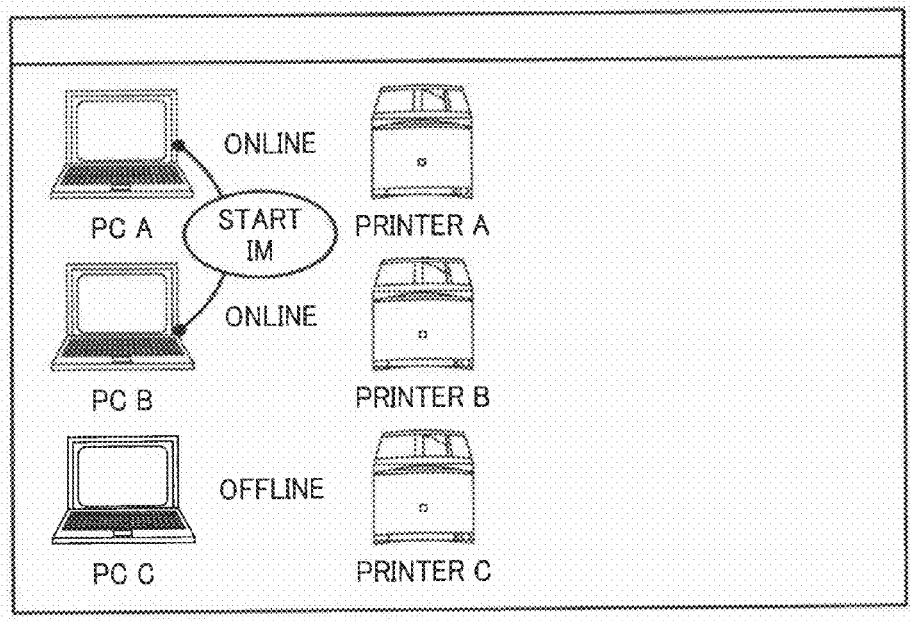
FIG. 17 is a schematic diagram of a display screen displayed after IM transmission is set.
Figure 18:
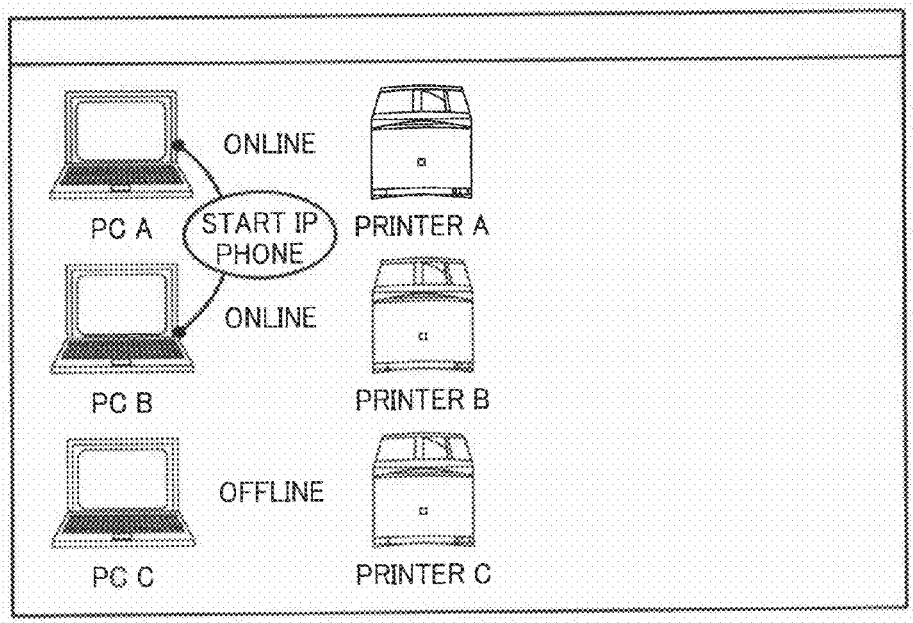
FIG. 18 is a schematic diagram of a display screen displayed after IP phone is set.
Figure 19:
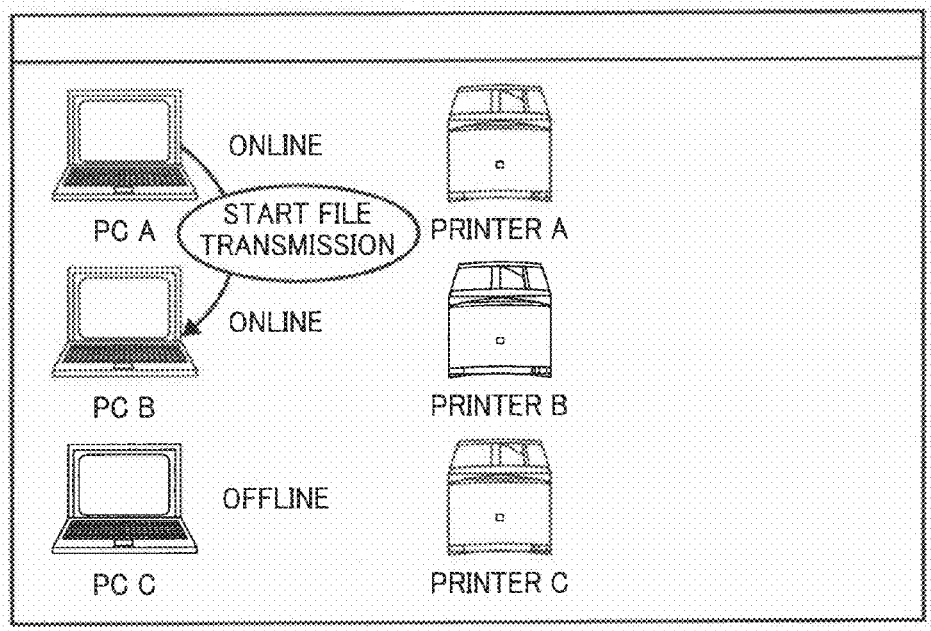
FIG. 19 is a schematic diagram of a display screen displayed after file transmission is set.

FIG. 16 is a schematic diagram of one example of a display screen displayed when the icon representing the PC-A is dragged and dropped onto an icon representing the PC-B. In this case, as the job types for the process selection instruction based on the device combination DB 207, IM transmission, IP phone, and file transmission are displayed. FIG. 17 is a schematic diagram of a display screen displayed after the IM transmission is set, FIG. 18 is a schematic diagram of a display screen displayed after the IP phone is set, and FIG. 19 is a schematic diagram of a display screen displayed after the file transmission is set.

The setting IM transmission means that a computer program for instant messaging is activated between the dragged network device (PC) and the drop-destination network device (PC), and an IP address of each network device's counterpart is specified as a destination. In this case, the process execution instruction to the device management server 100 determined by the instruction transmitting unit 204 includes an instruction for activating the instant messaging program at the dragged network device and the drop-destination network device and an instruction for specifying the IP address of each network device's counterpart as a destination.

The setting IP phone means that a computer program for IP phone is activated between the dragged network device (PC) and the drop-destination network device (PC), and an IP address of each network device's counterpart is specified as a destination. In this case, the process execution instruction to the device management server 100 determined by the instruction transmitting unit 204 includes an instruction for activating the IP phone program at the dragged network device and the drop-destination network device and an instruction for specifying the IP address of each network device's counterpart as a destination.

The setting file transmission means that a file is transferred from the dragged network device (PC) to the drop-destination network device (PC). In this case, the process execution instruction to the device management server 100 determined by the instruction transmitting unit 204 includes an instruction for transferring a file from the dragged network device to the drop-destination network device.

According to the display instruction system in the first embodiment, the display instruction server 200 transmits a display screen on which icons representing network devices are arranged on a screen layout to the PC 700 to be displayed on the displaying device of the PC 700. When a drag-and-drop operation is performed by the operator on the PC 700 between icons representing a plurality of network devices, an instruction for executing a job-related process or a communication-related process between the network devices that are subjected to the drag-and-drop operation is transmitted to the device management server 100 that manages the network devices that are subjected to the drag-and-drop operation, and is then executed between the network devices. Therefore, load distribution among network devices can be achieved. Furthermore, the operator can easily recognize network devices and processes using the network devices.

In a display instruction system according to a second embodiment, icons representing users are further displayed on the display screen. With the icons representing the users also being subjected to a drag-and-drop operation, various processes are executed among the network devices for use by the users.

Figure 20:
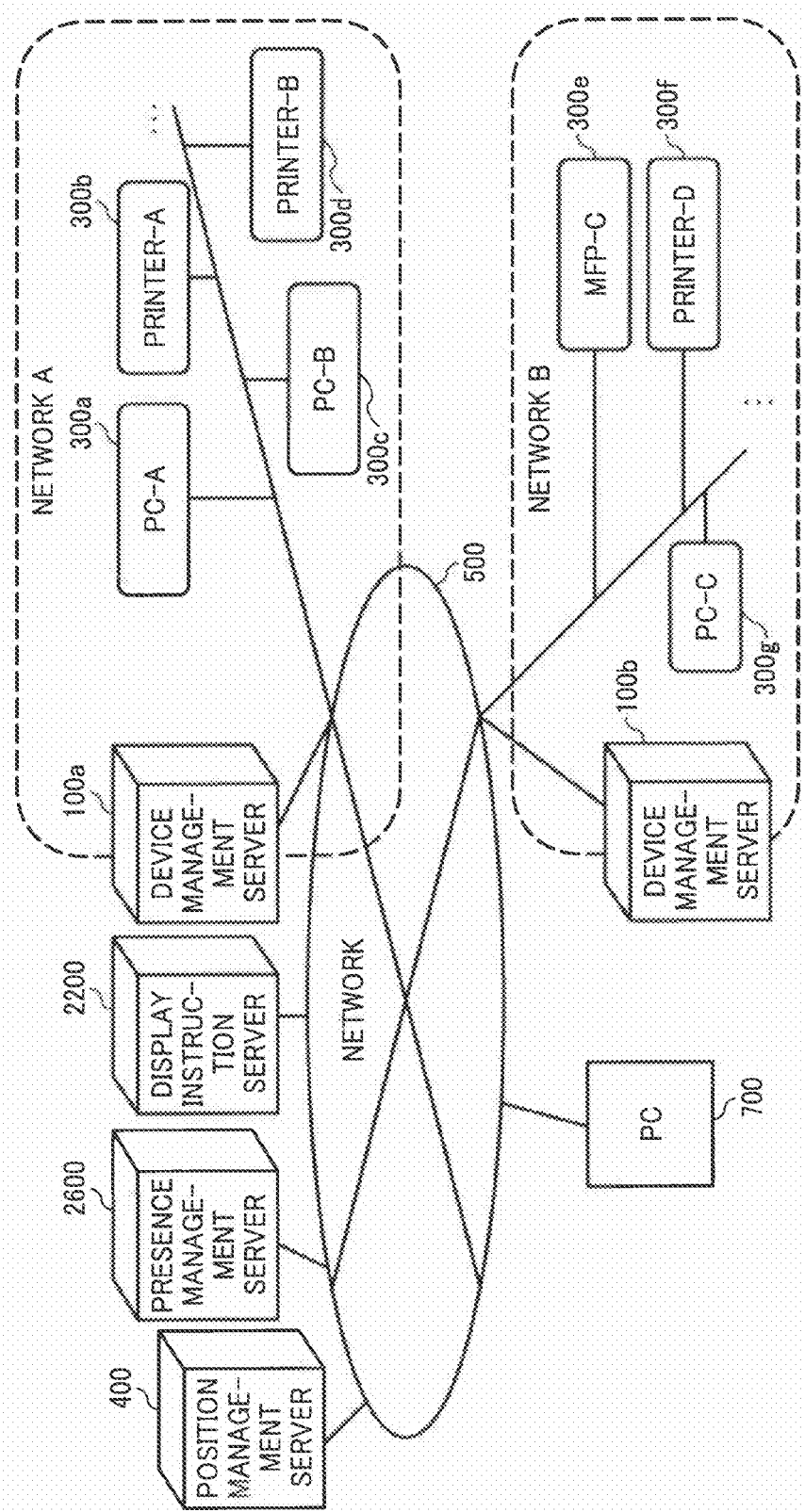
FIG. 20 is a block diagram of a network configuration of a display instruction system according to a second embodiment of the present invention.

FIG. 20 is a block diagram of a network configuration of the display instruction system according to the second embodiment. The display instruction system according to the second embodiment includes the device management servers 100a and 100b, a display instruction server 2200, a presence management server 2600, the position management server 400, and the PC 700 as a client terminal that are connected to each other via the network 500, such as a LAN or a WAN. The device management servers 100a, the position management server 400, the PC 700, and network devices in networks A and B are similar to those in the first embodiment.

The presence management server 2600 is a server device that manages present states indicative of possible job types for each user. The display instruction server 2200 includes functions similar to those in the first embodiment, and further includes functions of transmitting a display screen on which icons representing users that use the network devices are displayed on the screen layout to the PC 700, and transmitting, when a drag-and-drop operation by the operator between the icons representing the users is received from the PC 700, an instruction for executing a predetermined process between the network devices for use by the users that are subjected to the drag-and-drop operation to the network devices for use by the users that are subjected to the drag-and-drop operation.

Figure 21:
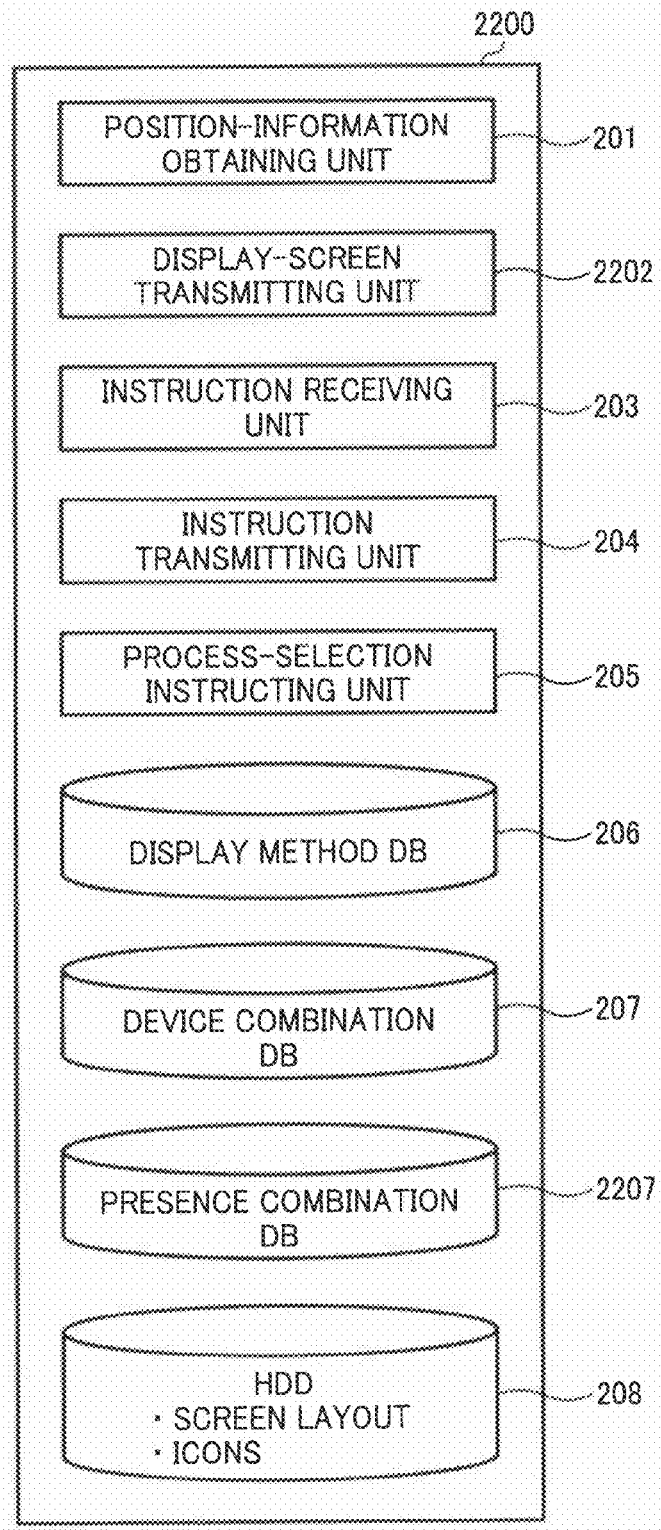
FIG. 21 is a block diagram of a functional configuration of a display instruction server in FIG. 20.

FIG. 21 is a block diagram of a functional configuration of the display instruction server 2200 according to the second embodiment. As shown in FIG. 21, the display instruction server 2200 includes the position-information obtaining unit 201, a display-screen transmitting unit 2202, the instruction receiving unit 203, the instruction transmitting unit 204, the process-selection instructing unit 205, the display method DB 206, the device combination DB 207, a presence combination DB 2207, and the HDD 208 storing data representing a screen layout and icons. The display method DB 206, the device combination DB 207, and the presence combination DB 2207 are stored in a storage medium, such as an HDD or memory.

The position-information obtaining unit 201, the instruction receiving unit 203, the instruction transmitting unit 204, the display method DB 206, the device combination DB 207, and the HDD 208 are similar to those according to the first embodiment.

The display-screen transmitting unit 2202 is a processing unit that causes icons representing the network devices to be displayed at positions on the screen layout corresponding to placement locations, as in the first embodiment, and also generates a display screen on which icons representing users are displayed and transmits the display screen to the PC 700 for display. Moreover, the display-screen transmitting unit 2202 issues a presence request to the presence management server 2600, with names of the users specified, to perform a process of obtaining presences of the users from the presence management server 2600. The presence means a process type of job that can be used by the user, that is, a job type.

The presence combination DB 2207 is a database having job types corresponding to presences of two users registered therein.

FIG. 22 is a table illustrating one example of data of the presence combination DB 2207. As shown in FIG. 22, the presence combination DB 2207 has registered therein presences overlapping between the presences 1 and 2 of two users as job types.

Figures 23, 24:
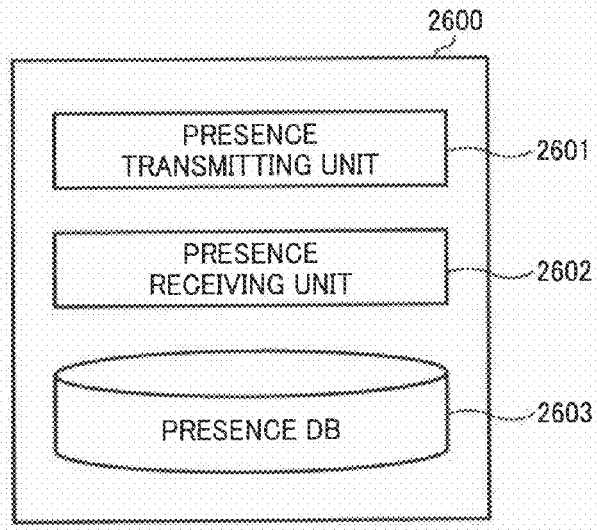
FIG. 23 is a block diagram of a functional configuration of a presence management server in FIG. 20.
FIG. 24 is a table illustrating one example of data of a presence DB.

Next, the presence management server 2600 is explained. FIG. 23 is a block diagram of a functional configuration of the presence management server 2600. As shown in FIG. 23, the presence management server 2600 includes a presence transmitting unit 2601, a presence receiving unit 2602, and a presence DB 2603.

The presence receiving unit 2602 is a processing unit that receives a presence of a network device for use by a user from the network device and registers the presence with the presence DB 2603.

The presence transmitting unit 2601 is a processing unit that reads, upon reception of a user's presence request from the display instruction server 2200, the requested presence of the user from the presence DB 2603, and then transmits the read presence to the display instruction server 2200.

The presence DB 2603 is a database having presences of users registered thereon, and is stored in a storage medium, such as an HDD or memory. FIG. 24 is a table illustrating one example of data of the presence DB 2603.

As shown in FIG. 24, the presence DB 2603 has registered thereon a name of the user, a device name of the network device (PC, terminal) for use by the user, an IP address of the network device, and presence.

Figure 25:
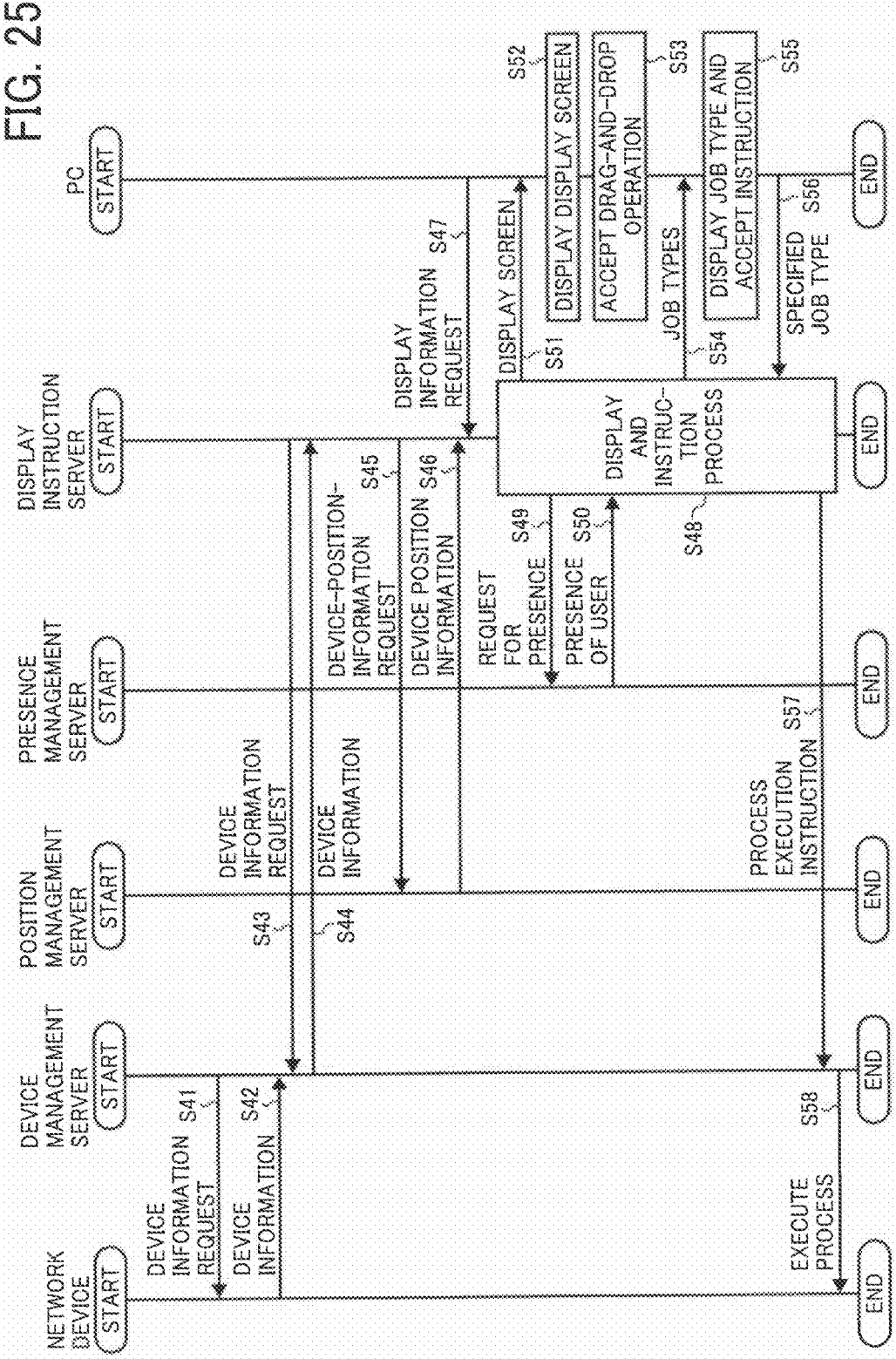
FIG. 25 is a sequence diagram of a flow of an entire process of a display instruction system according to the second embodiment.

Next, an entire process of the display instruction system configured as explained above according to the present embodiment is explained. FIG. 25 is a sequence diagram of a flow of an entire process of the display instruction system according to the second embodiment.

Figure 26:
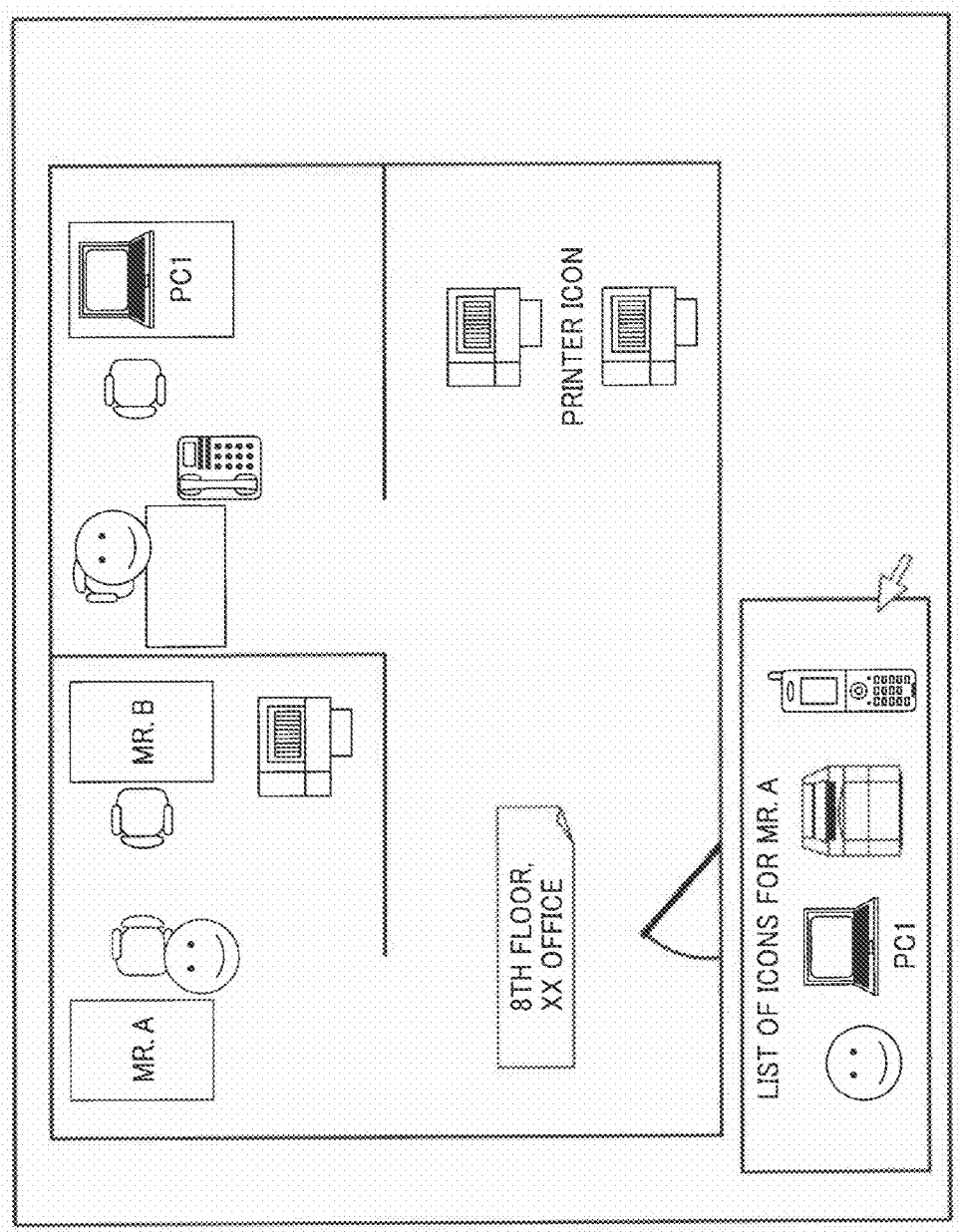
FIG. 26 is a schematic diagram of one example of a display screen according to the second embodiment.

Processes from steps S41 to S47 are performed in a similar manner to the processes from steps S1 to S17 in the first embodiment. When the display instruction server 2200 receives a display information request from the PC 700, a display and instruction process is executed (step S48). In the second embodiment, during this display and instruction process, to display the icons representing the users on the display screen, the display instruction server 200 requests the presence management server 2600 for presences of the users (step S49). In response, the display instruction server 200 obtains the presences of the users (step S50). Then, the display instruction server 200 generates a display screen including icons representing the users for transmission to the PC 700 (step S51). In the PC 700, the received display screen is displayed (step S52). FIG. 26 is a schematic diagram of one example of the display screen according to the second embodiment. As shown in FIG. 26, on the display screen, icons representing the users are displayed, and icons representing the network devices usable by the user are also displayed as a list.

The subsequent processes from steps S53 to S58 are performed in a similar manner to those from steps S21 to S26 in the first embodiment. However, in the present embodiment, a drag-and-drop operation can be performed on the icons representing the users on the display screen. A process when such an operation is performed is explained in details in the display and instruction process.

Figure 27:
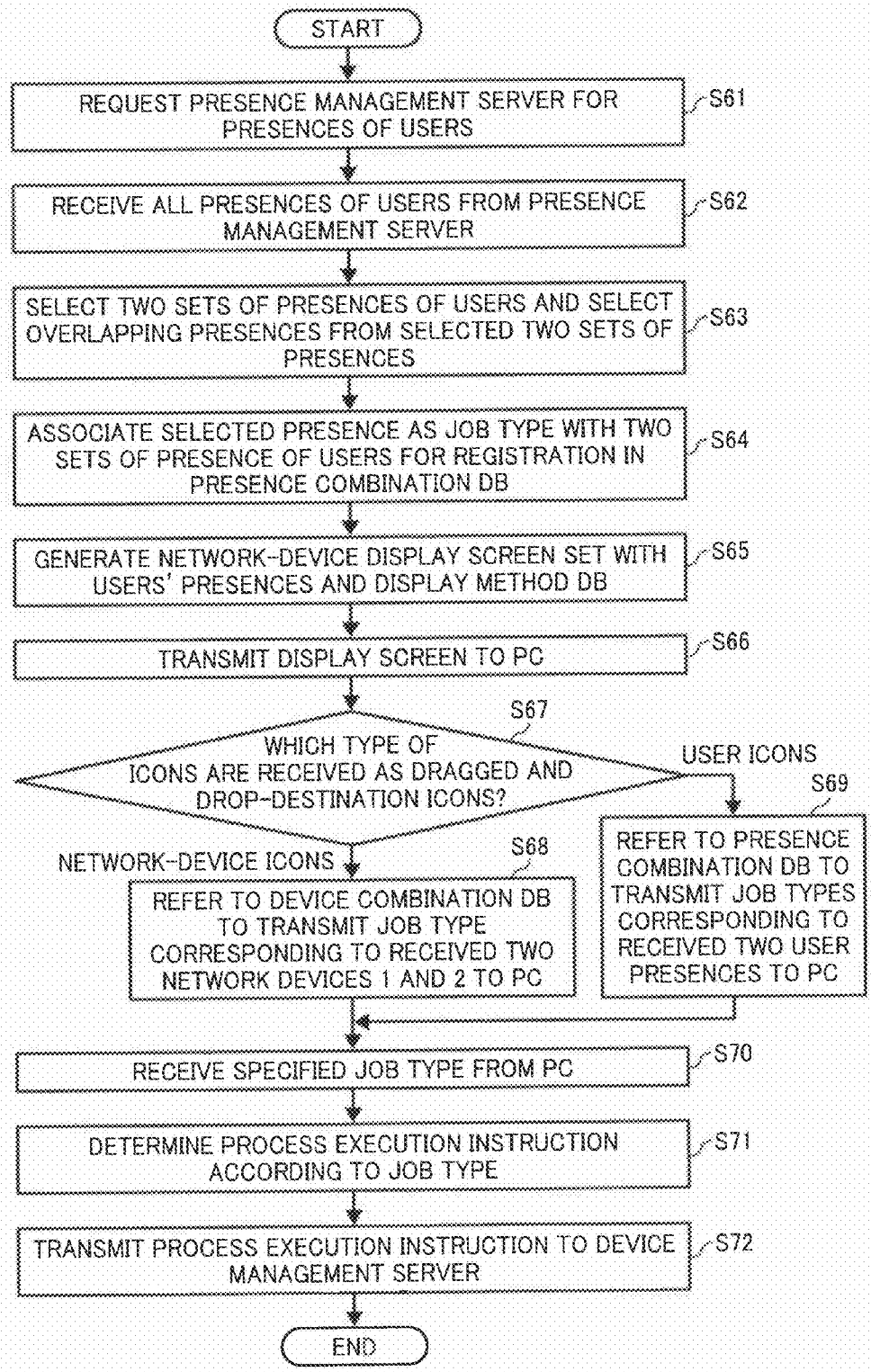
FIG. 27 is a flowchart of a procedure of a display and instruction process performed at the display instruction server according to the second embodiment.

Next, details of the display and instruction process at step S48 are explained. FIG. 27 is a flowchart of a procedure of a display and instruction process performed at the display instruction server 2200 according to the second embodiment.

Upon reception of a display-information request from the PC 700, with placement locations specified, the display-screen transmitting unit 2202 transmits to the presence management server 2600 a request for presences of users to be displayed on the display screen (step S61).

Upon reception of the presences of the users from the presence management server 2600 (step S62), two sets of the received presences are selected, and presences overlapping between the selected two sets of presences are selected (step S63).

The display-screen transmitting unit 2202 then associates the selected overlapping presences with the presences of the two users as job types for registration in the presence combination DB 2207 (step S64).

Next, the display-screen transmitting unit 2202 generates a display screen displaying the network devices and the users, with users' presences and the display method DB 206 (step S65). At this time, a screen layout corresponding to the requested placement locations is read from the HDD 208, and also icon images are read based on the file names of the icon images set at the display method DB 206. Then, by arranging the icon images on the screen layout at the coordinate positions registered as position information of the display method DB, a display screen is generated.

Next, the display-screen transmitting unit 2202 transmits the generated display screen to the PC 700 (step S66). The PC 700 causes the display screen to be displayed. When the PC operator performs a drag-and-drop operation on an icon representing a network device or an icon representing a user on this display screen, the instruction receiving unit 203 of the display instruction server 200 checks the types of the icons that are subjected to the drag-and-drop operation (step S67).

Then, when the icons that are subjected to the drag-and-drop operation represent network devices, the process-selection instructing unit 205 refers to the device combination DB 207 to transmit to the PC 700 job types corresponding to the received two device names as a process selection instruction (step S68).

On the other hand, at step S67, when the icons that are subjected to the drag-and-drop operation represent users, the presence combination DB 2207 is referred to, and job types corresponding to the presences of the received two users are transmitted to the PC 700 as a process selection instruction (step S69).

The instruction receiving unit 203 receives a specified job from the PC 700 (step S70), and the instruction transmitting unit 204 determines a process execution instruction according to the received job (step S71) and transmits the determined process execution instruction to the device management server 100 (step S72).

Figure 28:
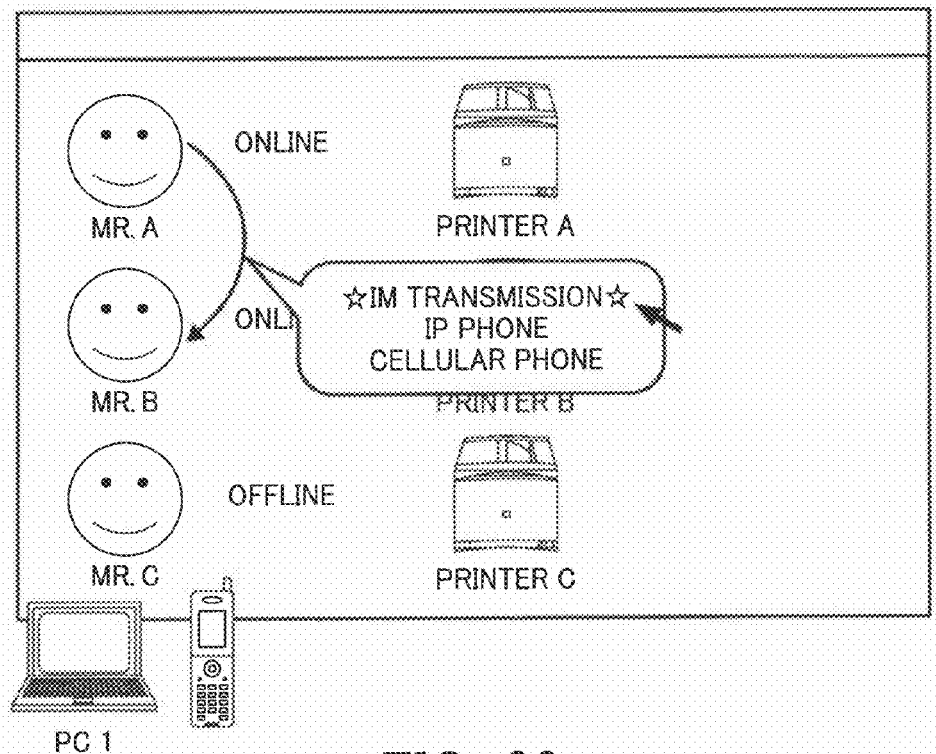
FIG. 28 is a schematic diagram of one example of a display screen displayed when an icon representing Mr. A is dragged and dropped onto an icon representing Mr. B.
Figure 29:
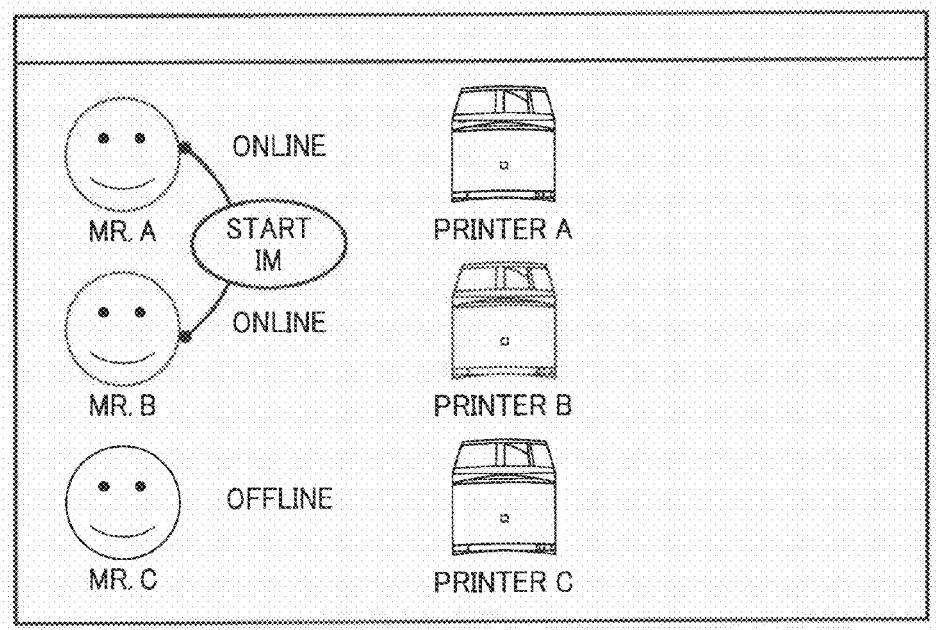
FIG. 29 is a schematic diagram of a display screen displayed after IM transmission is set.
Figure 30:
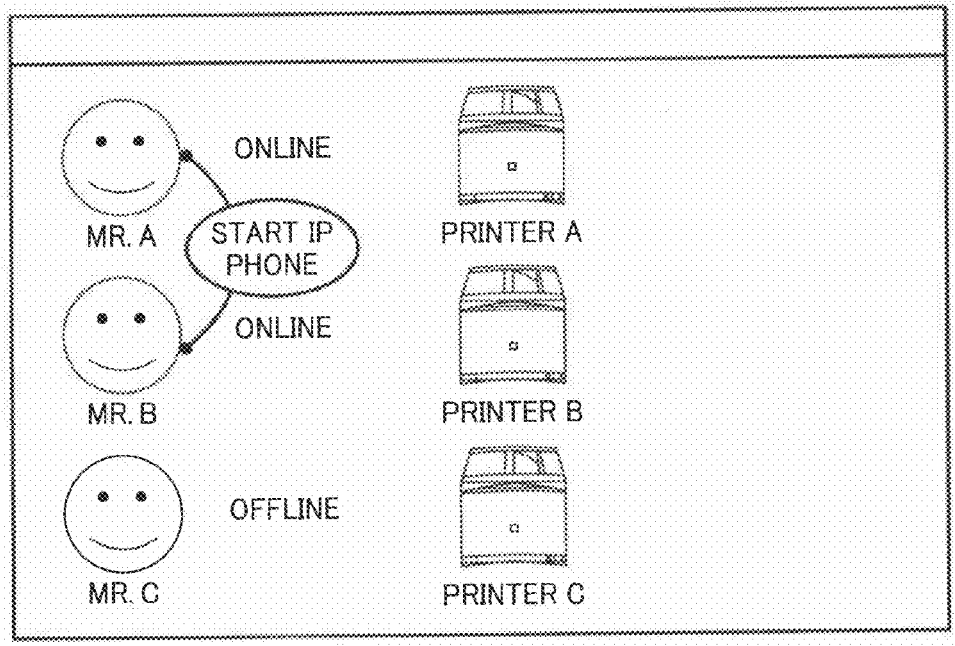
FIG. 30 is a schematic diagram of a display screen displayed after IP phone is set.
Figure 31:
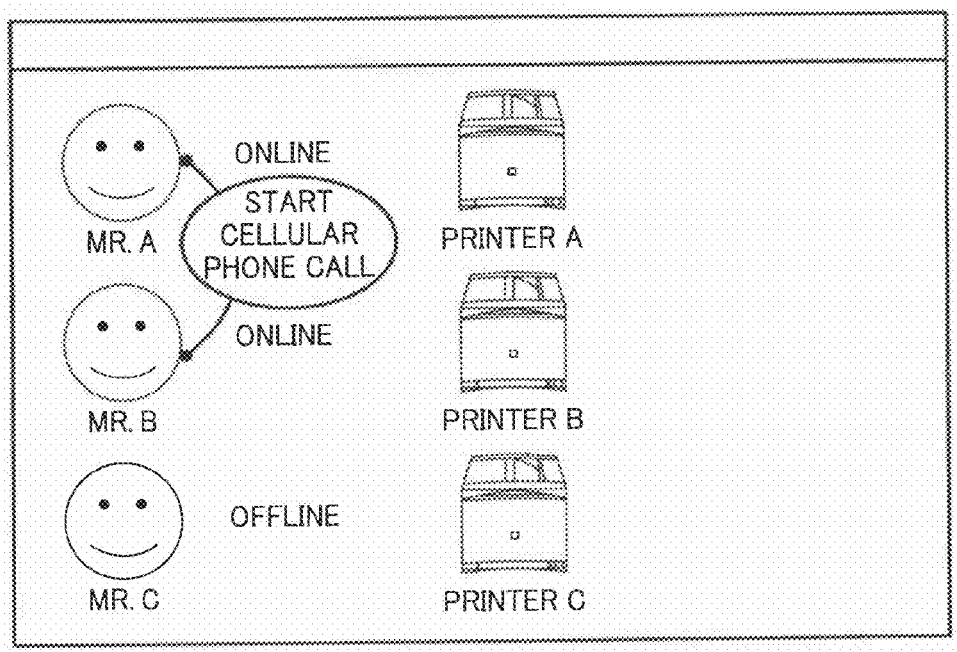
FIG. 31 is a schematic diagram of a display screen displayed after cellular phone is set.

FIG. 28 is a schematic diagram of one example of a display screen displayed when an icon representing Mr. A is dragged and dropped onto an icon representing Mr. B. In this case, as job types for the process selection instruction based on the presence combination DB 2207, IM transmission, IP phone, and cellular phone are displayed. FIG. 29 is a schematic diagram of a display screen displayed after the IM transmission is set, FIG. 30 is a schematic diagram of a display screen displayed after the IP phone is set, and FIG. 31 is a schematic diagram of a display screen displayed after the cellular phone is set.

The setting IM transmission means that a computer program for instant messaging is activated between the network device corresponding to the dragged user, i.e., for use by the dragged user and the network device corresponding to the drop-destination user, and an IP address of a network device corresponding to the user counterpart is specified as a destination. In this case, the process execution instruction to the device management server 100 determined by the instruction transmitting unit 204 includes an instruction for activating the instant messaging program at the network devices corresponding to the dragged and drop-destination users and an instruction for specifying the IP address of each user counterpart as a destination.

The setting IP phone means that a computer program for IP phone is activated between the network device corresponding to the dragged user and the network device corresponding to the drop-destination user, and an IP address of a network device corresponding to the user counterpart is specified as a destination. In this case, the process execution instruction to the device management server 100 determined by the instruction transmitting unit 204 includes an instruction for activating the IP phone program at the network devices corresponding to the dragged and drop-destination users and an instruction for specifying the IP address of each user counterpart as a destination.

The setting cellular phone means that cellular phone communication between the network device corresponding to the dragged user and the network device corresponding to the drop-destination user is started. In this case, the process execution instruction to the device management server 100 determined by the instruction transmitting unit 204 includes an instruction for starting a call with a specified telephone number of the cellular phone corresponding to the drop-destination user from the dragged user.

According to the display instruction system in the second embodiment, the display instruction server 2200 transmits a display screen on which icons representing network devices and also icons representing users are arranged on a screen layout to the PC 700 to be displayed on the displaying device of the PC 700. When the operator performs on the PC 700 a drag-and-drop operation on icons representing a plurality of users, an instruction for executing a process regarding communications among network devices for use by the users that are subjected to the drag-and-drop operation is transmitted to the device management server 100 that manages the network devices for use by the users that are subjected to the drag-and-drop operation, and is then executed among these network devices. Therefore, load distribution among network devices can be achieved. Furthermore, the operator can recognize network devices and processes using the network devices more easily.

The display instruction servers 200 and 2200, the position management server 400, the device management servers 100*a* and 100*b*, and the presence management server 2600 according to the first and second embodiments each has a hardware configuration using a normal computer, these servers each including: a control device, such as a CPU; a storage device, such as a Read Only Memory (ROM) or a Random Access Memory (RAM); an external storage device, such as an HDD or a Compact Disk (CD) drive; a displaying device; and an input device, such as a keyboard or a mouse.

An display instruction program to be executed on the display instruction server 200 according to the first and second embodiments are provided as being recorded as a file in an installable or executable format on a computer-readable recording medium, such as a Compact-Disk Read-Only Memory (CD-ROM), a flexible disk (FD), a Compact-Disk Recordable (CD-R), or a Digital Versatile Disk (DVD).

Moreover, the display instruction program to be executed on the display instruction server 200 according to the first and second embodiments can be configured to be stored on a computer connected to a network, such as the Internet, and downloaded via the network for provision. Furthermore, the display instruction program to be executed on the display instruction server 200 according to the first and second embodiments can be configured to be provided or distributed via a network, such as the Internet.

Moreover, the display instruction program to be executed on the display instruction server 200 according to the first and second embodiments can be configured to be provided as being incorporated in advance in a ROM or the like.

The display instruction program to be executed on the display instruction server 200 according to the first and second embodiments has a module configuration including each unit explained above (the position-information obtaining unit 201, the display-screen transmitting units 202 and 2202, the instruction receiving unit 203, the instruction transmitting unit 204, and the process-selection instructing unit 205). As actual hardware, the CPU (processor) reads the display instruction program from the recording medium for execution, thereby loading each unit onto a main storage device and generating the position-information obtaining unit 201, the display-screen transmitting units 202 and 2202, the instruction receiving unit 203, the instruction transmitting unit 204, and the process-selection instructing unit 205 on the main storage device.

Note that the present invention is not meant to be restricted to the embodiments as they are. In a practical stage, the components can be modified within a range not deviating from the gist of the present invention for implementation. Moreover, by appropriately combining the components disclosed in the embodiments, various embodiments of the present invention can be formed. For example, some components can be removed from all of the components disclosed in the embodiments. Furthermore, components of different embodiments can be combined as appropriate.

According to an aspect of the present invention, load distribution among network devices can be achieved, and the operator can easily recognize the network devices and processes using the network devices.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A display instruction apparatus comprising:
    a hardware processor;
    a first storage unit that stores a device name of a plurality of network devices connected to a network, and position information for a position on a screen that is associated to a respective device name; and
    a second storage unit that stores jobs executable in response to an icon representing a first one of the network devices being dragged and dropped onto an icon representing a second one of the network devices, said jobs being based on a combination of the first one and the second one of the network devices, wherein the hardware processor includes,
    a display-screen transmitting unit that when a display information request with specified placement locations is received from a client terminal connected to the network, refers to the first storage unit and generates a display screen on which icons representing the network devices are displayed at positions on a device layout image corresponding to the specified placement locations, and transmits the generated display screen to the client terminal; and
    an instruction transmitting unit that, in response to the icon representing the first one of the network devices being dragged and dropped onto the icon representing the second one of the network devices at the client terminal, refers to the second storage unit and transmits jobs corresponding to the combination of the first one and the second one of the network devices, and in response to receiving a selected job from the client terminal, and transmits an instruction for executing a predetermined process according to the selected job between the first one and the second one of the network devices that have icons subjected to being dragged and dropped.

2. The display instruction apparatus according to claim 1, wherein
    the network devices include image forming devices, and
    the instruction transmitting unit transmits an instruction for executing a job-related process executed on the first one and the second one of the image forming devices that have icons subjected to being dragged and dropped as the predetermined process to the image forming devices.

3. The display instruction apparatus according to claim 2, wherein the hardware processor further includes:
    a process-selection instructing unit that transmits, in response to the icon representing the first one of the network devices being dragged and dropped onto the icon representing the second one of the network devices at the client terminal, a selection instruction to select any one of processes of job moving, job dividing, and job copying as the job-related process to the client terminal, and the instruction transmitting unit transmits the instruction for executing the job-related process to the image forming devices.

4. The display instruction apparatus according to claim 1, wherein the icon representing the first one of the network devices, which is dragged, represents an information processing device and the icon representing the second one of the network devices is a drop-destination and represents a printing device that executes a print process, and the instruction transmitting unit transmits an instruction for executing a setting process regarding printing from the information processing device to the printing device as the predetermined process to either one of the information processing device and the printing device.

5. The display instruction apparatus according to claim 4, wherein the hardware processor further includes:

a process-selection instructing unit that transmits, in response to the icon representing the first one of the network devices being dragged and dropped onto the icon representing the second one of the network devices at the client terminal, a selection instruction to select either one of a default setting process on the printing device and a temporary setting process on the printing device as the setting process to the client terminal, and the instruction transmitting unit transmits the instruction for executing the setting process to the image processing device.

6. The display instruction apparatus according to claim 1, wherein the network devices include information processing devices, and the instruction transmitting unit transmits an instruction for executing a communication process between the information processing devices that are the first one of the network devices and the second one of the network devices as the predetermined process to the information processing devices.

7. The display instruction apparatus according to claim 6, wherein the hardware processor further includes:

a process-selection instructing unit that transmits, in response to the icon representing the first one of the network devices being dragged and dropped onto the icon representing the second one of the network devices at the client terminal, a selection instruction to select any one of message transmission, IP phone, and file transmission as the communication process to the client terminal, and the instruction transmitting unit transmits the instruction for executing the communication process from the client terminal to the information processing devices.

8. The display instruction apparatus according to claim 1, wherein the display screen further displays user symbols representing users using the network devices, and in response to the icon representing the first one of the network devices being dragged and dropped onto the icon representing the second one of the network devices at the client terminal, the instruction transmitting unit further transmits an instruction for executing a predetermined process between the first one of the network devices and the second one of the network devices to the network devices for use by the users.

9. The display instruction apparatus according to claim 8, wherein the instruction transmitting unit transmits an instruction for executing a communication process between the network devices for use by the users as the predetermined process to the network devices for use by the users.

10. The display instruction apparatus according to claim 9, wherein the hardware processor further includes:

a process-selection instructing unit that transmits, in response to the icon representing the first one of the network devices being dragged and dropped onto the icon representing the second one of the network devices at the client terminal, a selection instruction to select any one of message transmission, IP phone, and cellular phone as the communication process to the client terminal, and the instruction transmitting unit transmits the instruction for executing the communication process from the client terminal to the network devices for use by the users.

11. The display instruction apparatus according to claim 1, wherein the instruction transmitting unit is connected to the network, and transmits the instruction to a device management apparatus that instructs the network devices to perform the predetermined process.

12. A display instruction method performed by a display instruction apparatus that includes a display-screen transmitting unit, an instruction transmitting unit, a first storage unit that stores a device name of a plurality of network devices connected to a network and position information for a position on a screen that is associated with a respective device name, and a second storage unit that stores jobs executable in response to an icon representing a first one of the network devices being dragged and dropped onto an icon representing a second one of the network devices, said jobs being based on a combination of the first one and the second one of the network device, the display instruction method comprising:

at the display-screen transmitting unit, when a display information request with specified placement locations is received from a client terminal connected to the network, referring to the first storage unit and generating a display screen on which icons representing the network devices that are displayed at positions on a device layout image corresponding to the specified placement locations;

transmitting the generated display screen to the client terminal; and at the instruction transmitting unit, in response to the icon representing the first one of the network devices being dragged and dropped onto the icon representing the second one of the network devices at the client terminal, referring to the second storage unit and transmitting jobs corresponding to the combination of the first one and the second one of the network devices, and in response to receiving a selected job from the client terminal, and transmitting an instruction for executing a predetermined process according to the selected job between the first one and the second one of the network devices that have icons subjected to being dragged and dropped.

13. The display instruction method according to claim 12, wherein the network devices include image forming devices, and the transmitting the instruction includes transmitting an instruction for executing a job-related process executed on the image forming devices that have icons subjected to being dragged and dropped as the predetermined process to the image forming devices.

14. The display instruction method according to claim 12, wherein
the icon representing the first one of the network devices, which is dragged, represents an information processing device and the icon representing the second one of the network devices is a drop-destination and represents a printing device that executes a print process, and
the transmitting the instruction includes transmitting an instruction for executing a setting process regarding printing from the information processing device to the printing device as the predetermined process to either one of the information processing device and the printing device.

15. The display instruction method according to claim 12, wherein
the network devices include information processing devices, and
the transmitting the instruction includes transmitting an instruction for executing a communication process between the information processing devices that are the first one of the network devices and the second one of the network devices as the predetermined process to the information processing devices.

16. The display instruction method according to claim 12, wherein
the display screen further includes user symbols representing users using the network devices, and
in response to the icon representing the first one of the network devices being dragged and dropped onto the icon representing the second one of the network devices at the client terminal, the transmitting the instruction further includes transmitting an instruction for executing a predetermined process between the first one of the network devices and the second one of the network devices to the network devices for use by the users.

17. The display instruction method according to claim 12, wherein the transmitting the instruction includes transmitting the instruction to a device management apparatus that instructs the network devices to perform the predetermined process through the network.

18. A non-transitory computer-readable medium having computer readable program codes recorded thereon, the program codes configured to perform a displaying method when executed by a processor of a display instruction apparatus, the display instruction apparatus including a display-screen transmitting unit, an instruction transmitting unit, first a storage unit that stores a device name of a plurality of network devices connected to a network and position information for a position on a screen that is associated to a respective device name, and a second storage unit that stores jobs executable in response to an icon representing a first one of the network devices being dragged and dropped onto an icon representing a second one of the network devices, said jobs being based on a combination of the first one and the second one of the network device, the method comprising:
at the display-screen transmitting unit, when a display information request with specified placement locations is received from a client terminal connected to the network, referring to the first storage unit and generating a display screen on which icons representing the network devices are displayed at positions on a device layout image corresponding to the specified placement locations;
transmitting the generated display screen to the client terminal; and
at the instruction transmitting unit, in response to the icon representing the first one of the network devices being dragged and dropped onto the icon representing the second one of the network devices at the client terminal, referring to the second storage unit and transmitting jobs corresponding to the combination of the first one and the second one of the network devices, and in response to receiving a selected job from the client terminal, and transmitting an instruction for executing a predetermined process according to the selected job between the first one and the second one of the network devices that have icons subjected to being dragged and dropped.

\* \* \* \* \*